(12) United States Patent
Yang et al.

(10) Patent No.: US 12,498,577 B2
(45) Date of Patent: Dec. 16, 2025

(54) WEARABLE ELECTRONIC DEVICE INCLUDING DISPLAY MODULE

(71) Applicant: Samsung Electronics Co., Ltd., Suwon-si (KR)

(72) Inventors: Hyunmo Yang, Suwon-si (KR); Jonggyu Park, Suwon-si (KR); Sungkwang Yang, Suwon-si (KR); Gisoo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 18/532,092

(22) Filed: Dec. 7, 2023

(65) Prior Publication Data

US 2024/0142781 A1 May 2, 2024

Related U.S. Application Data

(63) Continuation of application No. PCT/KR2023/017300, filed on Nov. 1, 2023.

(30) Foreign Application Priority Data

Nov. 1, 2022 (KR) .................. 10-2022-0143977
Dec. 5, 2022 (KR) .................. 10-2022-0168062

(51) Int. Cl.
*G02B 27/01* (2006.01)
*G02B 27/00* (2006.01)
*G06F 3/01* (2006.01)

(52) U.S. Cl.
CPC ..... *G02B 27/0172* (2013.01); *G02B 27/0093* (2013.01); *G02B 27/0176* (2013.01);
(Continued)

(58) Field of Classification Search
CPC ............ G02B 27/0172; G02B 27/0093; G02B 27/0176; G02B 2027/0138; G02B 2027/0178; G06F 3/013; G06F 3/0304
See application file for complete search history.

(56) References Cited

U.S. PATENT DOCUMENTS 9,292,973 B2 * 3/2016 Bar-Zeev ........... G02B 27/0149
10,429,647 B2   10/2019 Gollier et al.
(Continued)

FOREIGN PATENT DOCUMENTS

CN      114217407 A    3/2022
JP      2014-219621 A  11/2014
(Continued)

OTHER PUBLICATIONS

International Search Report dated Jan. 30, 2024, issued in International Patent Application No. PCT /KR2023/017300.

*Primary Examiner* — Grant Sitta
(74) *Attorney, Agent, or Firm* — Jefferson IP Law, LLP

(57) ABSTRACT

A wearable electronic device is provided. The wearable electronic device includes a housing, and at least one display module disposed on the housing, wherein the display module includes a fixed barrel including a body part and a segment part protruding along an outer periphery of the body part, a rotary barrel disposed on an outer surface of the body part and rotatably combined with the body part, a first lens module fixed to the body part of the fixed barrel, a display combined with the fixed barrel to cover the first lens module, a second lens module inserted into the body part of the fixed barrel to face the first lens module, engaged with the rotary barrel, and configured to move in a first axis direction against the first lens module as the rotary barrel is rotated against the fixed barrel, a light-emitting member, and an eye tracking camera module.

18 Claims, 15 Drawing Sheets

(52) U.S. Cl.
CPC ...... *G06F 3/013* (2013.01); *G02B 2027/0138* (2013.01); *G02B 2027/0178* (2013.01)

(56) References Cited

U.S. PATENT DOCUMENTS

| | | | |
|---|---|---|---|
| 10,510,137 B1* | 12/2019 | Kitain | F41G 3/2611 |
| 10,852,550 B2 | 12/2020 | Lee et al. | |
| 2002/0163486 A1* | 11/2002 | Ronzani | G02B 27/0176 |
| | | | 345/87 |
| 2014/0098427 A1 | 4/2014 | Kang | |
| 2015/0226932 A1 | 8/2015 | Konishi et al. | |
| 2017/0102549 A1* | 4/2017 | Lee | G02B 27/0176 |
| 2017/0160518 A1 | 6/2017 | Lanman et al. | |
| 2017/0235133 A1* | 8/2017 | Border | G02B 26/0833 |
| | | | 345/8 |
| 2018/0267320 A1* | 9/2018 | Chen | G02B 27/0176 |
| 2019/0159354 A1 | 5/2019 | Zheng et al. | |
| 2020/0051320 A1* | 2/2020 | Laffont | G06T 5/70 |
| 2020/0124857 A1* | 4/2020 | Bierhuizen | G02B 27/0093 |
| 2020/0296459 A1 | 9/2020 | Taniguchi | |
| 2020/0310119 A1* | 10/2020 | Lee | G02B 27/0172 |
| 2021/0068316 A1* | 3/2021 | Kamakura | G02B 27/0176 |
| 2022/0171188 A1 | 6/2022 | Gruhlke | |
| 2022/0253135 A1* | 8/2022 | Cohen | G02B 27/0093 |
| 2023/0176401 A1 | 6/2023 | Shin et al. | |
| 2023/0280596 A1* | 9/2023 | Ogawa | G02B 27/0176 |
| | | | 359/630 |
| 2024/0272439 A1* | 8/2024 | Jiang | G02B 7/022 |

FOREIGN PATENT DOCUMENTS

| | | |
|---|---|---|
| KR | 10-2014-0044641 A | 4/2014 |
| KR | 10-2017-0044296 A | 4/2017 |
| KR | 10-2019-0027950 A | 3/2019 |
| KR | 10-2019-0032587 A | 3/2019 |
| KR | 10-2019-0057871 A | 5/2019 |
| KR | 10-2022-0005958 A1 | 1/2022 |

\* cited by examiner

WEARABLE ELECTRONIC DEVICE INCLUDING DISPLAY MODULE

CROSS-REFERENCE TO RELATED APPLICATION(S)

This application is a continuation application, claiming priority under § 365(c), of an International application No. PCT/KR2023/017300, filed on Nov. 1, 2023, which is based on and claims the benefit of a Korean patent application number 10-2022-0143977, filed on Nov. 1, 2022, in the Korean Intellectual Property Office, and of a Korean patent application number 10-2022-0168062, filed on Dec. 5, 2022, in the Korean Intellectual Property Office, the disclosure of each of which is incorporated by reference herein in its entirety.

TECHNICAL FIELD

The disclosure relates to a wearable electronic device including a display module. More particularly, the disclosure relates to an electronic device that may be a head mounted device that provides an image for a virtual reality (VR) to a user.

BACKGROUND ART

Recently, with the development of technology, an electronic device has been deviated from the uniform rectangular shape, and has been gradually changed to various shapes. For example, an electronic device may include a wearable electronic device that can be worn on a part of a human body. An example of a wearable electronic device worn on any part of the body may be a head mounted device (HMD) mounted on the head of a user and providing an image of a virtual reality to the user.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

A wearable electronic device, such as a head mounted device, may include a display module located to correspond to the left eye and the right eye of the user and providing an image of a virtual reality. The display module may include an eye tracking camera module that tracks a user's eye. Further, the display module may include a light-emitting member that emits an infrared light to the pupil of the user so that the eye tracking camera module is able to smoothly capture an image of the user's pupil.

Meanwhile, the display module may require a diopter adjustment function to compensate for the eyesight of a person with the poor eyesight. In this case, the display module may include a plurality of lenses, and the user's eyesight difference may be adjusted by adjusting intervals of the plurality of lenses. For example, the display module may include the plurality of lenses, and the diopter may be adjusted by relatively moving one of the plurality of lenses against another of the plurality of lenses. The eye tracking camera module and the light-emitting member may be disposed on some of the lenses based on the mounting space of the display module. In such a structure, if the user adjusts the diopter of the display module, the eye tracking camera module and the light-emitting member may move together with the lenses. Accordingly, the distance between the eye tracking camera module and the light-emitting member and the user's eye may be changed, and thus a malfunction may occur in tracking the user's eye.

Aspects of the disclosure are to address at least the above-mentioned problems and/or disadvantages and to provide at least the advantages described below. Accordingly, an aspect of the disclosure is to provide an electronic device may be a head mounted device that provides an image for a VR to a user.

Additional aspects will be set forth in part in the description which follows and, in part, will be apparent from the description, or may be learned by practice of the presented embodiments.

Solution to Problem

In accordance with an aspect of the disclosure, a wearable electronic device is provided. The wearable electronic device includes a housing configured to form an exterior of the wearable electronic device, and at least one display module disposed on the housing, wherein the display module includes: a fixed barrel including a body part and a segment part protruding along an outer periphery of the body part, a rotary barrel disposed on an outer surface of the body part and rotatably combined with the body part, a first lens module fixed to the body part of the fixed barrel, a display combined with the fixed barrel to cover the first lens module, a second lens module inserted into the body part of the fixed barrel to face the first lens module, engaged with the rotary barrel, and configured to move in a first axis direction against the first lens module as the rotary barrel is rotated against the fixed barrel, a light-emitting member disposed on the segment part of the fixed barrel, and an eye tracking camera module disposed adjacent to the light-emitting member and configured to track a user's eye.

In accordance with another aspect of the disclosure, a wearable electronic device is provided. The wearable electronic device includes a housing configured to form an exterior of the wearable electronic device, and at least one display module disposed on the housing, wherein the display module includes: a fixed barrel, a rotary barrel disposed on an outer surface of the fixed barrel and rotatably combined with the fixed barrel, a first lens module fixed to the fixed barrel, a second lens module inserted inside the fixed barrel to face the first lens module, engaged with the rotary barrel, and configured to move in a first axis direction against the first lens module as the rotary barrel is rotated against the fixed barrel, a cover member including an opening facing the second lens module and a segment part surrounding the opening, and covering the fixed barrel and the rotary barrel, a light-emitting member disposed on the segment part of the cover member, and an eye tracking camera module disposed adjacent to the light-emitting member and configured to track a user's eye.

Advantageous Effects of Invention

According to an embodiment disclosed in this document, the eye tracking camera module and the light-emitting member may be disposed on the display module in which the diopter adjustment is possible. Further, the locations of the eye tracking camera module and the light-emitting member against the display module may be fixed. Accordingly, the distance between the eye tracking camera module and the light-emitting member and the user's eye is not changed, and thus the malfunction can be improved in tracking the user's eye.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
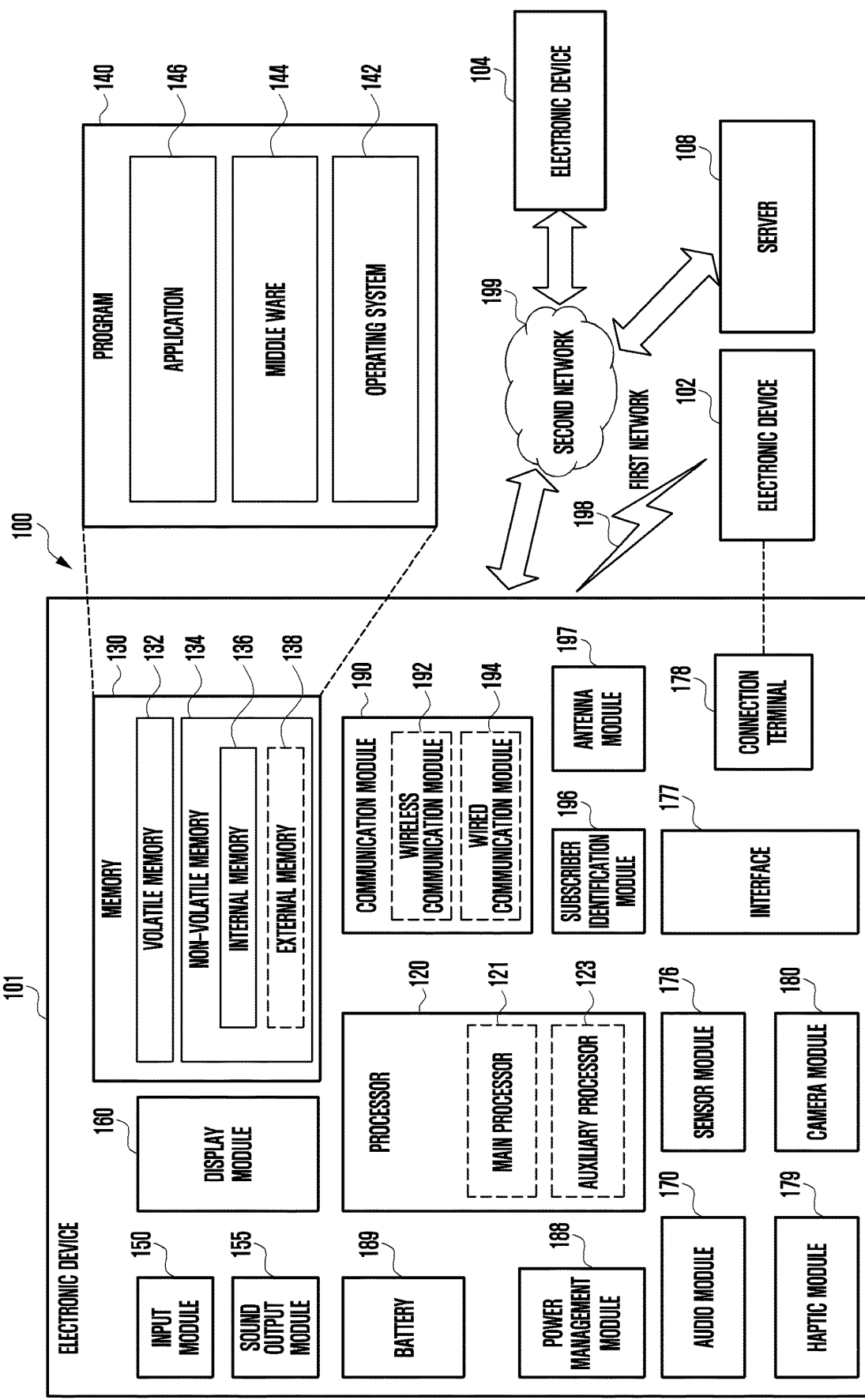
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication.

According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per Second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
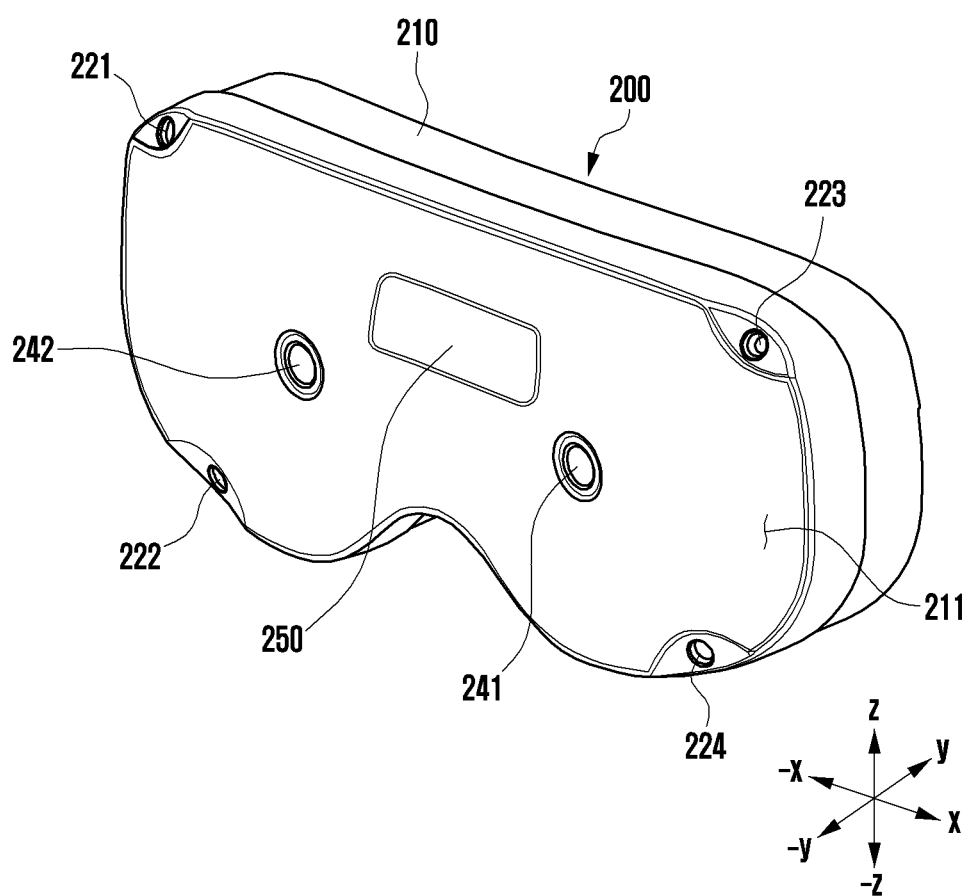
FIGS. 2A and 2B are perspective views schematically illustrating a front surface and a rear surface of a wearable electronic device according to various embodiments of the disclosure.
Figure 2B:
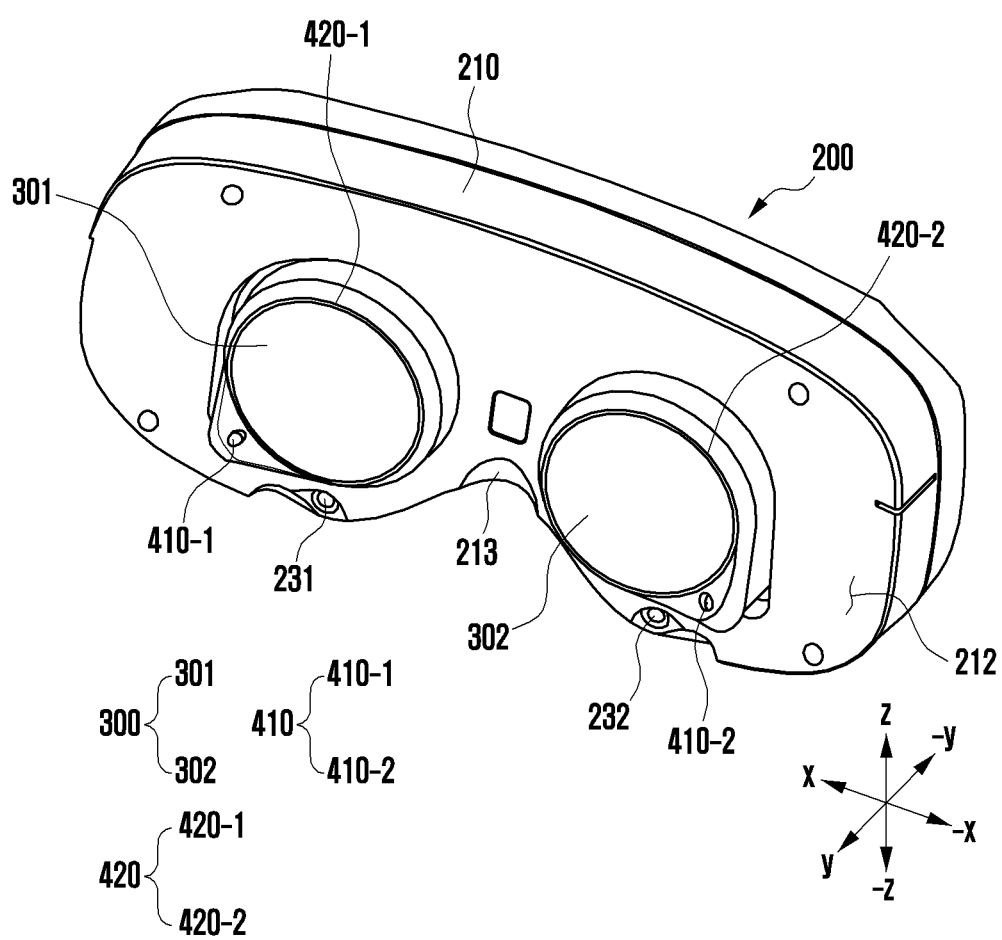

FIGS. 2A and 2B are perspective views schematically illustrating a front surface and a rear surface of a wearable electronic device 200 according to various embodiments of the disclosure.

Referring to FIGS. 2A and 2B, the electronic device may be a wearable electronic device 200. In an embodiment of the disclosure, the wearable electronic device 200 may be a virtual reality (VR) device that provides a virtual reality to a user. For example, the wearable electronic device 200 may include a video see-through (VST) device.

According to an embodiment of the disclosure, as illustrated in FIGS. 2A and 2B, the wearable electronic device 200 may include a distance sensor 250, a face recognition camera 231 and 232, a printed circuit board (not illustrated), a first display module 301, and/or a second display module 302. In a certain embodiment of the disclosure, the wearable electronic device 200 may be implemented to include at least some of the constituent elements included in the electronic device 101 of FIG. 1 or to additionally include other constituent elements. The locations or shapes of the constituent elements included in the wearable electronic device 200 may be variously modified without being limited to the examples illustrated in FIGS. 2A and 2B.

According to an embodiment of the disclosure, the wearable electronic device 200 may include a housing 210. In an embodiment of the disclosure, the housing 210 may include a first surface (e.g., front surface) 211 exposed to an external environment and a second surface (e.g., rear surface) 212 coming in close contact with the skin of the user. For example, in case that the wearable electronic device 200 is worn on the face of the user, the first surface 211 of the wearable electronic device 200 may be exposed to the external environment, and the second surface 212 of the wearable electronic device 200 may at least partly come in close contact with the face of the user. In an embodiment of the disclosure, the wearable electronic device 200 may come in close contact with the face of the user through various constituent elements. For example, the wearable electronic device 200 may make the second surface 212 of the housing 210 come in close contact around the eyes of the user's face by using a band formed of an elastic material, being combined with the housing 210. In another embodiment of the disclosure, the wearable electronic device 200 may be worn on the user's face through eyeglass temples, helmets, or straps. In addition, the wearable electronic device 200 may be partially worn on the user's face through various constitutions.

In an embodiment of the disclosure, the housing 210 of the wearable electronic device 200 may be formed to have a shape or a structure that can be easily worn on the user's face. For example, the second surface 212 of the housing 210 may be formed in a streamlined shape so as to cover the eyes and a part of the nose of the user. In an embodiment of the disclosure, a nose recess 213 may be formed on the second surface 212 of the housing 210 so as to support the user's nose.

In an embodiment of the disclosure, the housing 210 of the wearable electronic device 200 may be formed of a light weight material (e.g., plastic) so that the user can feel comfortable wearing. Meanwhile, the housing 210 may be formed of a non-metal and/or metal material having a predetermined level of stiffness against an external impact. The metal material may include alloys of aluminum, stainless steel (STS or SUS), iron, magnesium, titanium, and the like, and the non-metal material may include synthetic resin, ceramic, and engineering plastic.

Referring to FIGS. 2A and 2B, the wearable electronic device 200 may include a plurality of imaging camera modules 241 and 242 (e.g., camera module 190 of FIG. 1) disposed to correspond to a front direction (e.g., −Y direction based on FIG. 2A, or user's gaze direction) of the wearable electronic device 200. For example, the wearable electronic device 200 may include the first imaging camera module 241 corresponding to the user's left eye and the second imaging camera module 242 corresponding to the user's right eye. The wearable electronic device 200 may transfer, to the user's eye, an external environment in the front direction (e.g., −Y direction based on FIG. 2A) of the wearable electronic device 200 by using the first imaging camera module 241 and the second imaging camera module 242.

According to an embodiment of the disclosure, the plurality of imaging camera modules 241 and 242 illustrated in FIG. 2A may include one or a plurality of lenses, an image sensor, and/or an image signal processor. In an embodiment of the disclosure, the locations or the number of imaging camera modules 241 and 242 are not limited to the illustrated example, but may be diverse. In an embodiment of the disclosure, the imaging camera modules 241 and 242 may measure a depth of field (DOF). The wearable electronic device 200 may perform various functions, such as head tracking, hand detection or tracking, gesture recognition, or space recognition, by using the depth of field (e.g., 3 degrees of freedom (3DOF) or 6DOF) obtained through the imaging camera modules 241 and 242. The plurality of imaging camera modules 241 and 242 may include, for example, a global shutter (GS) camera or a rolling shutter (RS) camera, and the locations or the number of imaging camera modules is not limited to the illustrated example, but may be diverse. According to an embodiment of the disclosure, the first imaging camera module 241 and/or the second imaging camera module 242 may recognize a surrounding space of the wearable electronic device 200. The first imaging camera module 241 and/or the second imaging camera module 242 may detect user's gestures within a predetermined distance (e.g., predetermined space) of the wearable electronic device 200. The first imaging camera module 241 and/or the second imaging camera module 242 may include a global shutter (GS) camera capable of reducing a rolling shutter (RS) phenomenon in order to detect and track the user's quick hand movement and/or a fine movement of the finger.

According to an embodiment of the disclosure, as illustrated in FIG. 2A, on the first surface 211 of the housing 210, at least one recognition camera module 221, 222, 223, and/or 224 may be disposed. In an embodiment of the disclosure, the recognition camera modules 221, 222, 223, and 224 may obtain image data for an external image. The external image data obtained through the recognition camera modules 221, 222, 223, and 224 may be transferred to the user through the display modules 300 disposed for the left eye and the right eye of the user, respectively. The locations or the number of recognition camera modules 221, 222, 223, and/or 224 are not limited to the example illustrated in FIG. 2A, but may be diverse.

According to an embodiment of the disclosure, as illustrated in FIG. 2A, on the first surface 211 of the housing 210, at least one distance sensor 250 may be disposed. For example, the at least one distance sensor 250 may measure the distance from at least one object disposed around the wearable electronic device 200. The at least one distance sensor 250 may include an infrared sensor, an ultrasonic sensor, and/or a light detection and ranging (LiDAR) sensor. The at least one distance sensor 250 may be implemented based on the infrared sensor, the ultrasonic sensor, and/or the LiDAR sensor. The locations or the number of distance sensors 250 are not limited to the example illustrated in FIG. 2A, but may be diverse.

According to an embodiment of the disclosure, as illustrated in FIG. 2B, the wearable electronic device 200 may include an eye tracking camera module 410. The eye tracking camera module 410 may detect and track the user's pupil. For example, the eye tracking camera module 410 may make the center of a virtual image being played on the display (e.g., display 370 of FIG. 4) be located in accordance with a direction in which the user's pupil gazes. The eye tracking camera module 410 may track the user's gaze by using, for example, at least one of an electro-oculography or electrooculogram (EOG) sensor, a coil system, a dual Purkinje system, bright pupil systems, or dark pupil systems. Further, the eye tracking camera module 410 may include a global shutter (GS) camera to be able to track the user's quick pupil movement. For example, the camera part (e.g., a camera part 411 of FIG. 3) of the eye tracking camera module 410 may be the GS camera.

In an embodiment of the disclosure, the eye tracking camera module 410 may include, for example, at least one camera part 41 (e.g., micro camera or IR light emitting diode (LED)) disposed on the second surface 212 of the housing 210 to track the wearer's eye. In an embodiment of the disclosure, the eye tracking camera module 410 may include a first eye tracking camera module 410-1 disposed on the second surface 212 of the housing 210 to track the user's left eye, and a second eye tracking camera module 410-2 tracking the user's right eye. The wearable electronic device 200 may identify the user's gaze direction based on the movement of the pupil tracked by using the plurality of eye tracking camera modules 410-1 and 410-2.

According to an embodiment of the disclosure, the wearable electronic device 200 may detect the eye corresponding to a dominant eye and/or a non-dominant eye between the left eye and the right eye of the user by using the first eye tracking camera module 410-1 and/or the second eye tracking camera module 410-2. For example, the wearable electronic device 200 may detect the eye corresponding to the dominant eye and/or the non-dominant eye based on the user's eye direction against the external object or the virtual object.

According to an embodiment of the disclosure, as illustrated in FIG. 2B, on the second surface 212 of the wearable electronic device 200, at least one face recognition camera 231 and 232 may be disposed. For example, the plurality of face recognition cameras 231 and 232 may recognize the user's face in a situation that the wearable electronic device 200 is worn on the user's face. In an embodiment of the disclosure, the face recognition cameras 231 and 232 may detect the user's facial expression. In an embodiment of the disclosure, the wearable electronic device 200 may determine whether the wearable electronic device 200 is worn on the user's face by using the plurality of face recognition cameras 231 and 232. In an embodiment of the disclosure, the camera part 411 of the eye tracking camera module 410 may be a face recognition camera.

According to an embodiment of the disclosure, as illustrated in FIG. 2A, the wearable electronic device 200 may include at least one light-emitting member 420. For example, the light-emitting member 420 may provide status information of eth wearable electronic device 200 in the form of light. As another example, the light-emitting member 420 may provide a light source interworking with the operation of the eye tracking camera module 410. The light-emitting member 420 may include, for example, an LED, an IR LED, or a xenon lamp. In an embodiment of the disclosure, the light-emitting member 420 may emit light in order to increase accuracy of the first eye tracking camera module 410-1, the second eye tracking camera module 410-2, the first face recognition camera 231, and/or the second face recognition camera 232.

According to an embodiment of the disclosure, with reference to FIG. 2A, the light-emitting member 420 may include a first light-emitting member 420-1 disposed in the first display module 301 and a second light-emitting member 420-2 disposed in the second display module 302. The first light-emitting member 420-1 may emit the light to the user's left eye, and thus may increase the accuracy when the first eye tracking camera module 410-1 captures an image of the user's left eye. The second light-emitting member 420-2 may emit the light to the user's right eye, and thus may increase the accuracy when the second eye tracking camera module 410-2 captures an image of the user's right eye.

According to an embodiment of the disclosure, the wearable electronic device 200 may include a plurality of display modules 300 disposed on the second surface 212 located in a rear direction (e.g., +Y direction based on FIG. 2A, or opposite direction to the user's gaze direction) of the wearable electronic device 200. For example, on the second surface 212 of the wearable electronic device 200, the first display module 301 corresponding to the user's left eye and the second display module 302 corresponding to the user's right eye may be disposed. For example, in case that the wearable electronic device 200 is worn on the user's face, the first display module 301 may be disposed to correspond to the user's left eye and the second display module 302 may be disposed to correspond to the user's right eye.

Figure 3:
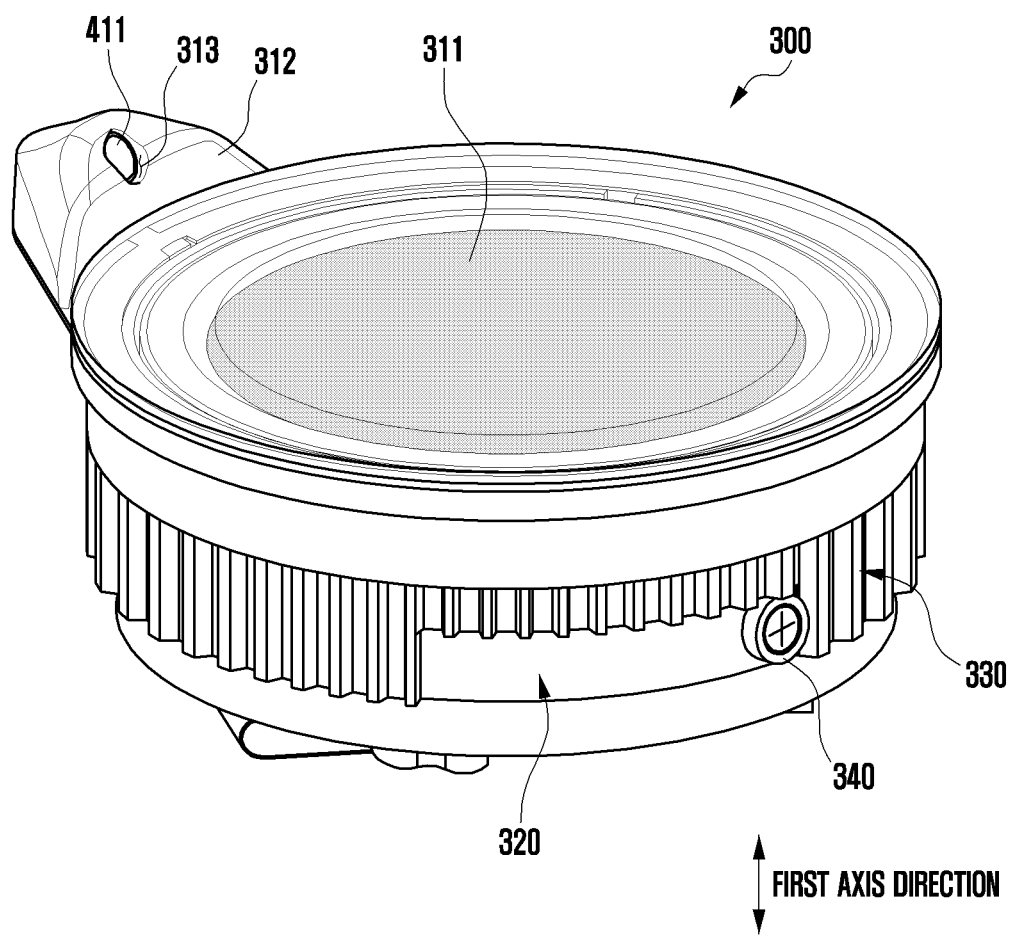
FIG. 3 is a view illustrating a display module according to an embodiment of the disclosure.
Figure 4:
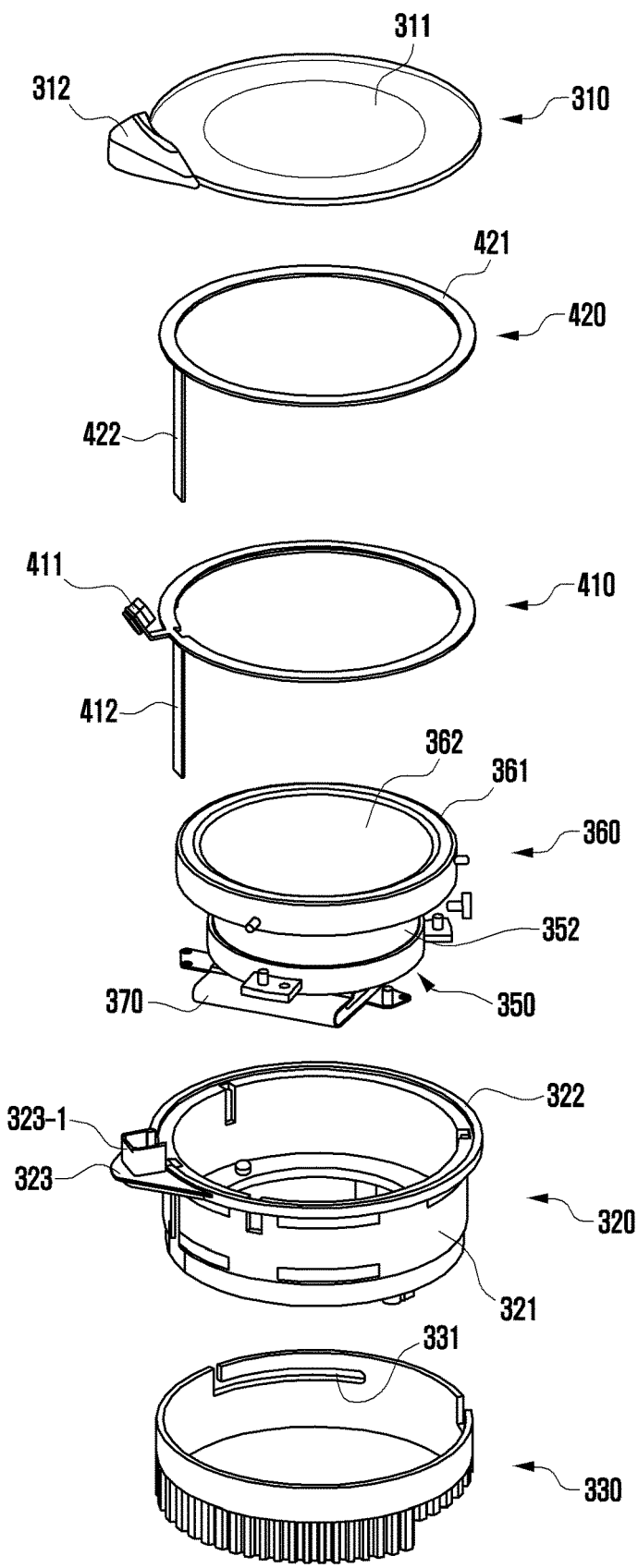
FIG. 4 is an exploded perspective view of the display module illustrated in FIG. 3 according to an embodiment of the disclosure.
Figure 5A:
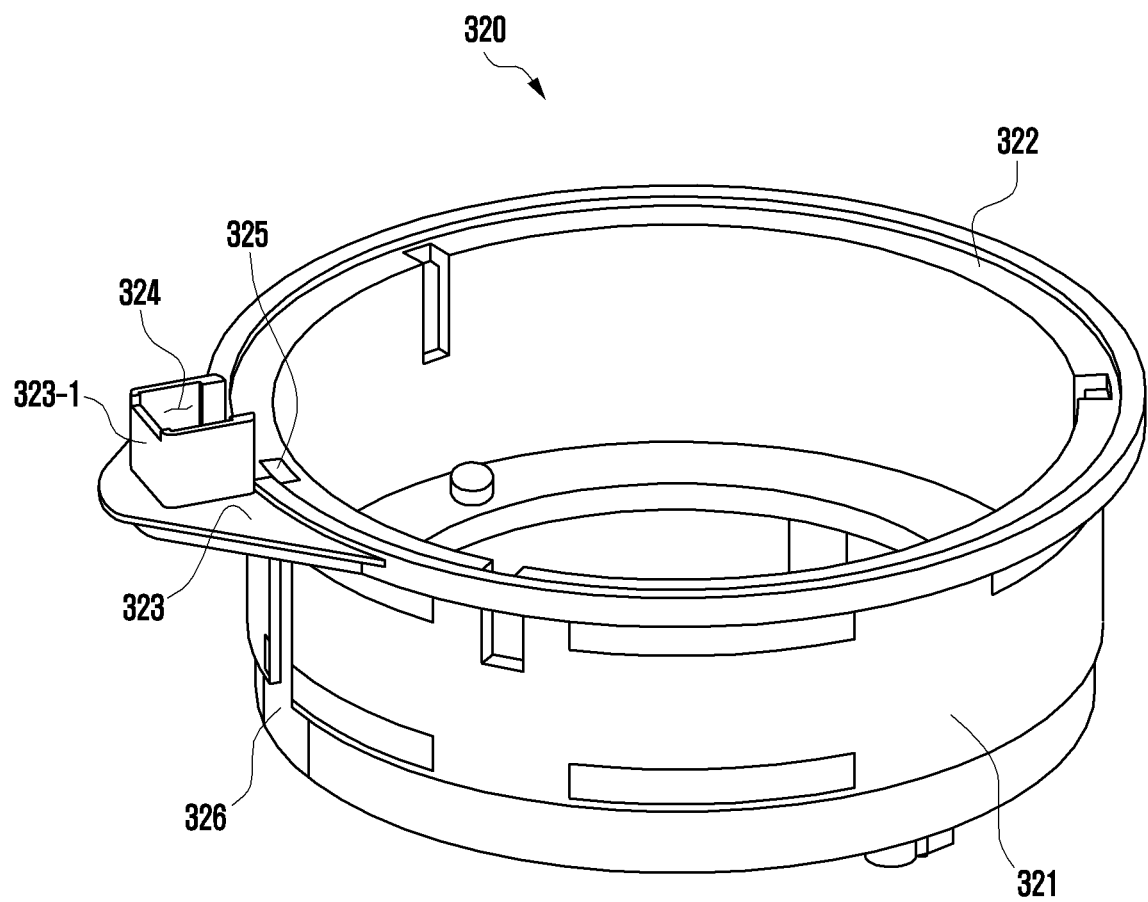
FIG. 5A is a view illustrating a fixed barrel of a display module according to an embodiment of the disclosure.
Figure 5B:
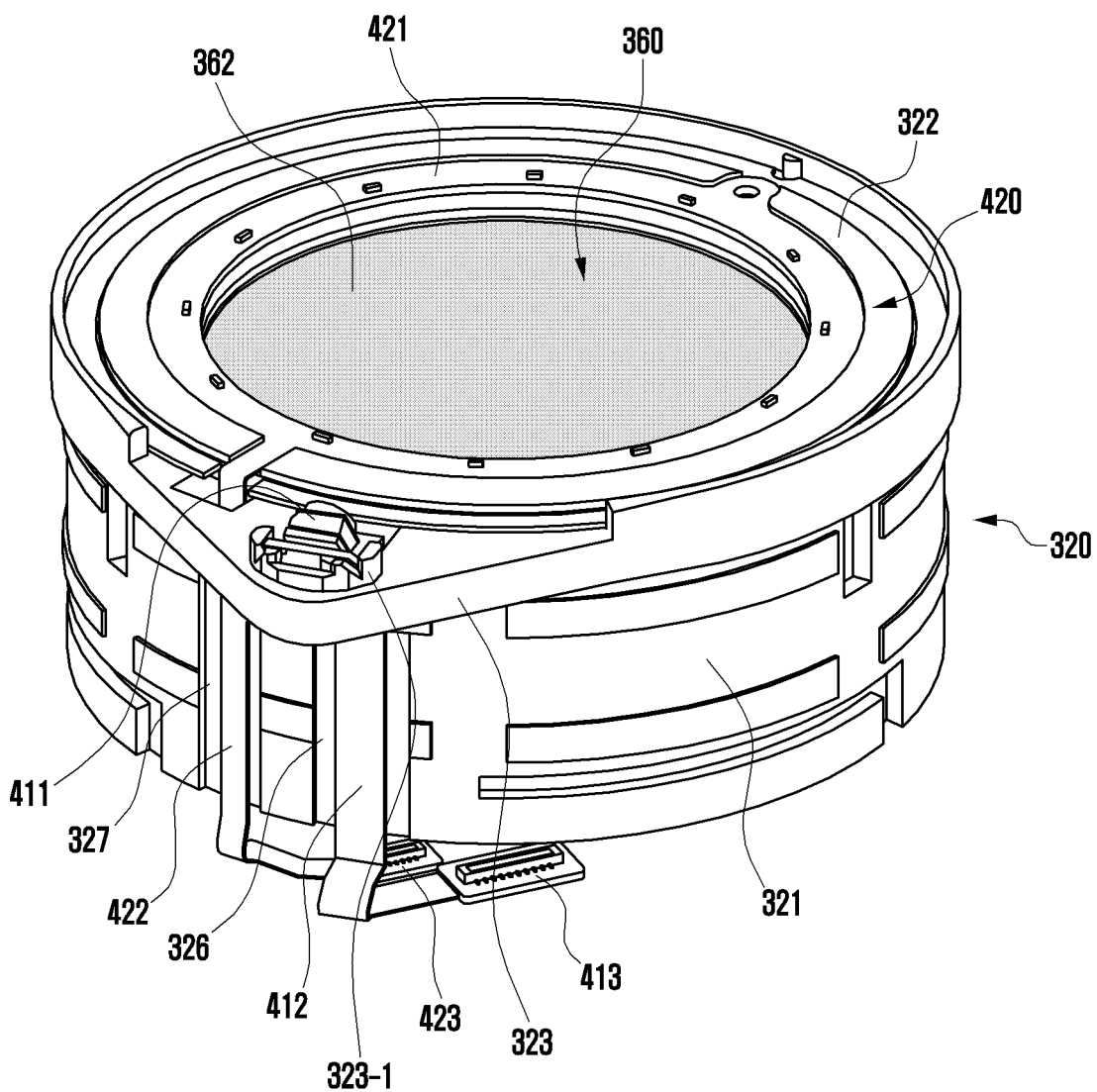
FIG. 5B is a view illustrating a state where a first lens module, a second lens module, a light-emitting member, and an eye tracking camera module are disposed on a fixed barrel according to an embodiment of the disclosure.

FIG. 3 is a view illustrating a display module according to an embodiment of the disclosure. FIG. 4 is an exploded perspective view of the display module illustrated in FIG. 3 according to an embodiment of the disclosure. FIG. 5A is a view illustrating a fixed barrel 320 of a display module according to an embodiment of the disclosure. FIG. 5B is a view illustrating a state where a first lens module 350, a second lens module 360, a light-emitting member, and an eye tracking camera module 410 are disposed on a fixed barrel 320 according to an embodiment of the disclosure.

Hereinafter, the display module 300 illustrated in FIG. 2B will be described. In the following description, in describing the first display module 301 and the second display module 302, the display module 300 will be described. The display module 300 may mean including of the first display module 301 and the second display module 302. The first display module 301 and the second display module 302 may include substantially the same constitution. For example, the first display module 301 and the second display module 302 may include a front plate 310, a fixed barrel 320, a rotary barrel 330, a stopper 340, a first lens module 350, a second lens module 360, and a display 370. At least one of the above-described constitutions may be omitted, or at least one constitution may be added.

Further, in describing the first eye tracking camera module 410-1 and the second eye tracking camera module 410-2 hereinafter, the eye tracking camera module 410 will be described. The eye tracking camera module 410 may mean including of the first eye tracking camera module 410-1 and the second eye tracking camera module 410-2. The first eye tracking camera module 410-1 and the second eye tracking camera module 410-2 may include substantially the same constitution. For example, the first eye tracking camera module 410-1 and the second eye tracking camera module 410-2 may include a camera part 411, a first connection part 412, and/or a first connector 413. At least one of the above-described constitutions may be omitted, or at least one constitution may be added.

In the same manner, in describing the first light-emitting member 420-1 and the second light-emitting member 420-2, the light-emitting member 420 including the first light-emitting member 420-1 and the second light-emitting member 420-2 will be described. The first light-emitting member 420-1 and the second light-emitting member 420-2 may include substantially the same constitution. For example, the first light-emitting member 420-1 and the second light-emitting member 420-2 may include a light-emitting part 421, a second connection part 422, and/or a second connector 423. At least one of the above-described constitutions may be omitted, or at least one constitution may be added.

According to an embodiment of the disclosure, FIG. 3 illustrates the display module 300 disclosed in this document, and FIG. 4 is an exploded perspective view of the display module 300 according to FIG. 3. As illustrated in FIGS. 3 and 4, the display module 300 may include the front plate 310, the fixed barrel 320, the rotary barrel 330, the first lens module 350, the second lens module 360, the display 370, the eye tracking camera module 410, and/or the light-emitting member 420. At least one of the above-described constitutions may be omitted, or another constitution may be added.

Referring to FIGS. 3, 4, and 5A, the display module 300 may include the fixed barrel 320 and the rotary barrel 330. The fixed barrel 320 may include a body part 321, a segment part 322 (e.g., cutting part or intercept part), and/or a seating part 323. In an embodiment of the disclosure, the body part 321 may be a body of the fixed barrel 320. The segment part 322 may be a protrusion part of an outer periphery of the body part 321 against the body part 321. The seating part 323 may be a part on which the camera part 411 of the eye tracking camera module 410 is seated. For example, the seating part 323 may project from the segment part 322 of the fixed barrel 320 in one direction, and may provide a space for seating the camera part 411 thereon. In an embodiment of the disclosure, the rotary barrel 330 may be disposed on an outer surface of the body part 321 of the fixed barrel 320 and may be rotatably combined with the body part 321. In an embodiment of the disclosure, the fixed barrel 320 may be utensils fixed to the housing 210 of FIG. 2A, and the rotary barrel 330 may be utensils combined with the fixed barrel 320 and being relatively rotated against the fixed barrel 320. As described later, a plurality of lens modules 350 and 360 may be disposed on the fixed barrel 320. The plurality of lens modules 350 and 360 may serve to adjusting the focus so that a screen output on the display 370 can be viewed by the user's eye. In an embodiment of the disclosure, the first lens module 350 may be fixed to the fixed barrel 320. The second lens module 360 may be inserted into the body part 321 of the fixed barrel 320, and may be disposed to move in the first axis direction (e.g., first axis direction of FIG. 3) against the fixed barrel 320. For example, the second lens module 360 may be combined and engaged with the rotary barrel 330. Accordingly, the second lens module 360 may move in the first axis direction (e.g., first axis direction of FIG. 3) against the first lens module 350 as the rotary barrel 330 is rotated against the body part 321 of the fixed barrel 320.

Referring to FIGS. 4 and 5B, at least a part of the eye tracking camera module 410 may be disposed on the fixed barrel 320. In an embodiment of the disclosure, the eye tracking camera module 410 may include a camera part 411 configured to track the user's eye, a first connection part 412 connecting the camera part 411 and a printed circuit board included in the wearable electronic device 200 to each other, and a first connector 413 disposed on the first connection part 412 and combined with the printed circuit board. In an embodiment of the disclosure, the first connection part 412 may be integrally formed with the camera part 411. In a certain embodiment of the disclosure, the first connection part 412 may be formed separately from the camera part 411, and may be electrically connected to the first connection part 412.

Referring to FIGS. 5A and 5B, the camera part 411 of the eye tracking camera module 410 may be disposed on the segment part 322 of the fixed barrel 320. For example, the camera part 411 may be disposed on the seating part 323 protruding from the segment part 322 of the fixed barrel 320. In an embodiment of the disclosure, with reference to FIG. 5A, the fixed barrel 320 may include a partition wall part 323-1 protruding from the seating part 323 in one direction. The partition wall part 323-1 may be formed to surround at least a part of the camera part 411 disposed on the seating part 323 to protect the camera part 411 from an external impact. In an embodiment of the disclosure, the fixed barrel 320 may include a first hole 324 through which the first connection part 412 passes. For example, the first hole 324 may be formed on at least one of the segment part 322 and the seating part 323. The first connection part 412 may be electrically connected to the printed circuit board by passing through the first hole 324 formed on the seating part 323. For example, the eye tracking camera module 410 may be electrically connected to the printed circuit board as the first connector 413 disposed on one end of the first connection part 412 is inserted into another connector disposed on the printed circuit board or is soldered on the printed circuit board.

In an embodiment that is not illustrated in the drawings, the eye tracking camera module 410 may be disposed on the housing 210. The housing 210 may include a protrusion part (not illustrated) located adjacent to the display module 300. In an embodiment of the disclosure, the protrusion part may be utensils protruding from the second surface 212 of the housing 210 in one direction so as to surround at least a part of the display module 300. The camera part 411 of the eye tracking camera module 410 may be disposed on the protrusion part and may be disposed adjacent to the display module 300. For example, the camera part 411 may be disposed adjacent to the light-emitting member 420 disposed on the fixed barrel 320. Accordingly, the eye tracking camera module 410 may easily track the user's eye by using the light emitted from the light-emitting member 420.

According to an embodiment of the disclosure, the light-emitting member 420 may be disposed at a location adjacent to the user's eyeball so that the eye tracking camera module 410 can easily track the user's eye. In an embodiment of the disclosure, with reference to FIG. 5B, at least a part of the light-emitting member 420 may be disposed on the segment part 322 of the fixed barrel 320. The segment part 322 of the fixed barrel 320 may approach the user's eyeball in a state where the user wears the wearable electronic device 200 and the display module 300 is located on the left eye and the right eye of the user. Accordingly, the light-emitting member 420 may be disposed on the segment part 322 of the fixed barrel 320, and may emit light toward the left eye and the right eye of the user in a state where the user wears the wearable electronic device 200.

In an embodiment of the disclosure, with reference to FIGS. 4 and 5B, the light-emitting member 420 may include a light-emitting part 421 emitting the light, a second connection part 422 connecting the printed circuit board and the light-emitting part 421 of the wearable electronic device 200 to each other, and a second connector 423 disposed on the second connection part 422 and combined with the printed circuit board. In an embodiment of the disclosure, the second connection part 422 may be integrally formed with the light-emitting part 421, and in a certain embodiment of the disclosure, the second connection part 422 may be formed separately from the light-emitting part 421, and may be electrically connected to the light-emitting part 421. In the same manner, the second connector 423 may be integrally formed with the second connection part 422, and in a certain embodiment of the disclosure, the second connector 423 may be formed separately from the second connection part 422, and may be electrically connected to the second connection part 422.

In an embodiment of the disclosure, with reference to FIG. 5B, the light-emitting part 421 of the light-emitting member 420 may be disposed on at least a part of the segment part 322 of the fixed barrel 320. For example, the light-emitting part 421 may be disposed along the segment part 322 of the fixed barrel 320. In an embodiment of the disclosure, the fixed barrel 320 may include a second hole 325 through which the second connection part 422 passes. The second hole 325 may be formed on at least one of the segment part 322 and the seating part 323. The second connection part 422 may be electrically connected to the printed circuit board by passing through the second hole 325. For example, the light-emitting member 420 may be electrically connected to the printed circuit board as the second connector 423 disposed on one end of the second connection part 422 is inserted into another connector disposed on the printed circuit board or is soldered on the printed circuit board.

According to an embodiment of the disclosure, as illustrated in FIG. 5B, an undercut structure on which a wiring member of electronic components is disposed or seated may be formed on the fixed barrel 320. In an embodiment of the disclosure, the fixed barrel 320 may include a first undercut structure 326 on which the first connection part 412 of the eye tracking camera module 410 is seated. Further, in an embodiment of the disclosure, the fixed barrel 320 may include a second undercut structure 327 on which the second connection part 422 of the light-emitting member 420 is seated. Accordingly, the first connection part 412 of the eye tracking camera module 410 may be disposed on the first undercut structure 326 of the fixed barrel 320 by passing through the first hole 324 of the fixed barrel 320, and may be fixed to the fixed barrel 320. Further, the second connection part 422 of the light-emitting member 420 may be disposed on the second undercut structure 327 of the fixed barrel 320 by passing through the second hole 325 of the fixed barrel 320, and may be fixed to the fixed barrel 320.

According to an embodiment of the disclosure, as illustrated in FIGS. 5A and 5B, the fixed barrel 320 may include the segment part 322 formed along the outer periphery of the body part 321. The segment part 322 may be shaped to protrude from an inside to an outside of the body part 321. The fixed barrel 320 may secure an additional area in which electronic components can be disposed through the segment part 322. Through such structures, at least parts of the eye tracking camera module 410 and/or the light-emitting member 420 may be seated on the segment part 322 of the fixed barrel 320. For example, the camera part 411 of the eye tracking camera module 410 may be disposed on the seating part 323 extending from the segment part 322 in one direction. The light-emitting part 421 of the light-emitting member 420 may be disposed on the segment part 322, and may emit the light toward the user's eyeball. Meanwhile, the segment part 322 of the fixed barrel 320 may be located adjacent to the user's eyeball in a state where the user wears the wearable electronic device 200 so that the display module 300 of the wearable electronic device 200 is located on the left eye and the right eye. For example, there may be no obstacle between the camera part 411 of the eye tracking camera module 410 located on the segment part 322 of the fixed barrel 320 and the user's eyeball and between the light-emitting part 421 of the light-emitting member 420 and the user's eyeball. Accordingly, the eye tracking camera module 410 may track the gazes of the left eye and the right eye of the user by using the light emitted from the light-emitting part 421 toward the user's eyeball.

In an embodiment of the disclosure, with reference to FIGS. 3 and 4, the front plate 310 may be disposed to cover the fixed barrel 320. The front plate 310 may include a window 311 facing a second lens part 362 of the second lens module 360. In an embodiment of the disclosure, the window 311 may be formed of a transparent plate (e.g., glass plate including various coating layers or polymer plate). Accordingly, the user can visually recognize an image generated from the display 370 through the first lens module 350 to the second lens module 360.

In an embodiment of the disclosure, with reference to FIG. 4, a camera housing 312 may be disposed on the seating part 323 of the fixed barrel 320 so as to cover the camera part 411 of the eye tracking camera module 410 disposed on the fixed barrel 320. The camera housing 312 may include a camera hole 313, and the camera hole 313 may be disposed on the seating part 323 of the fixed barrel 320 so that the camera hole 313 corresponds to the camera part 411. In an embodiment of the disclosure, the camera housing 312 may be integrally formed with the front plate 310, and in a certain embodiment of the disclosure, the camera housing 312 may be formed as a separate constitution from the front plate 310.

FIGS. 6A, 6B, 6C, 6D, and 6E are views illustrating a process of assembling a display module according to various embodiments of the disclosure.

Figure 6A:
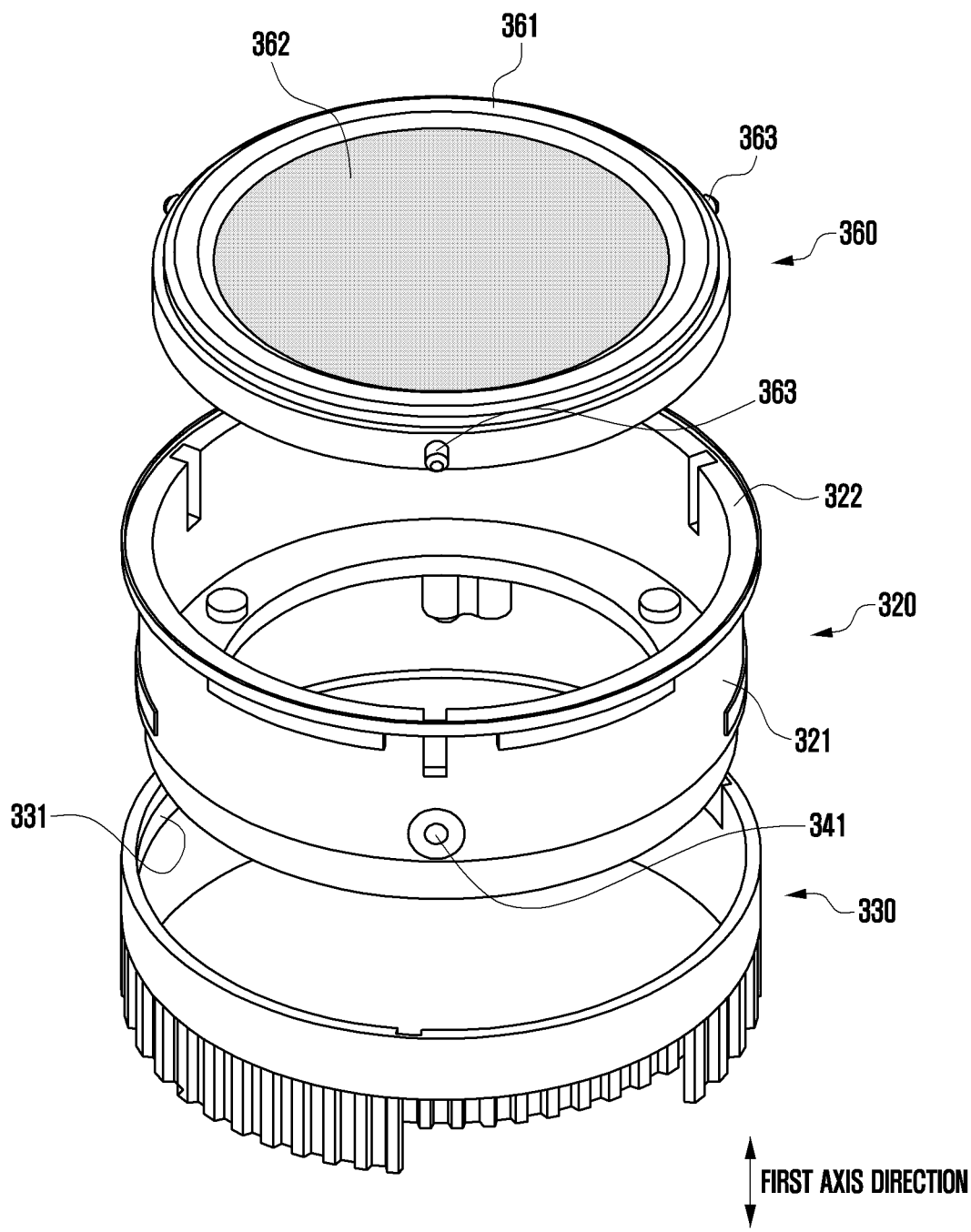
FIGS. 6A, 6B, 6C, 6D, and 6E are views illustrating a process of assembling a display module according to various embodiments of the disclosure.
Figure 6B:
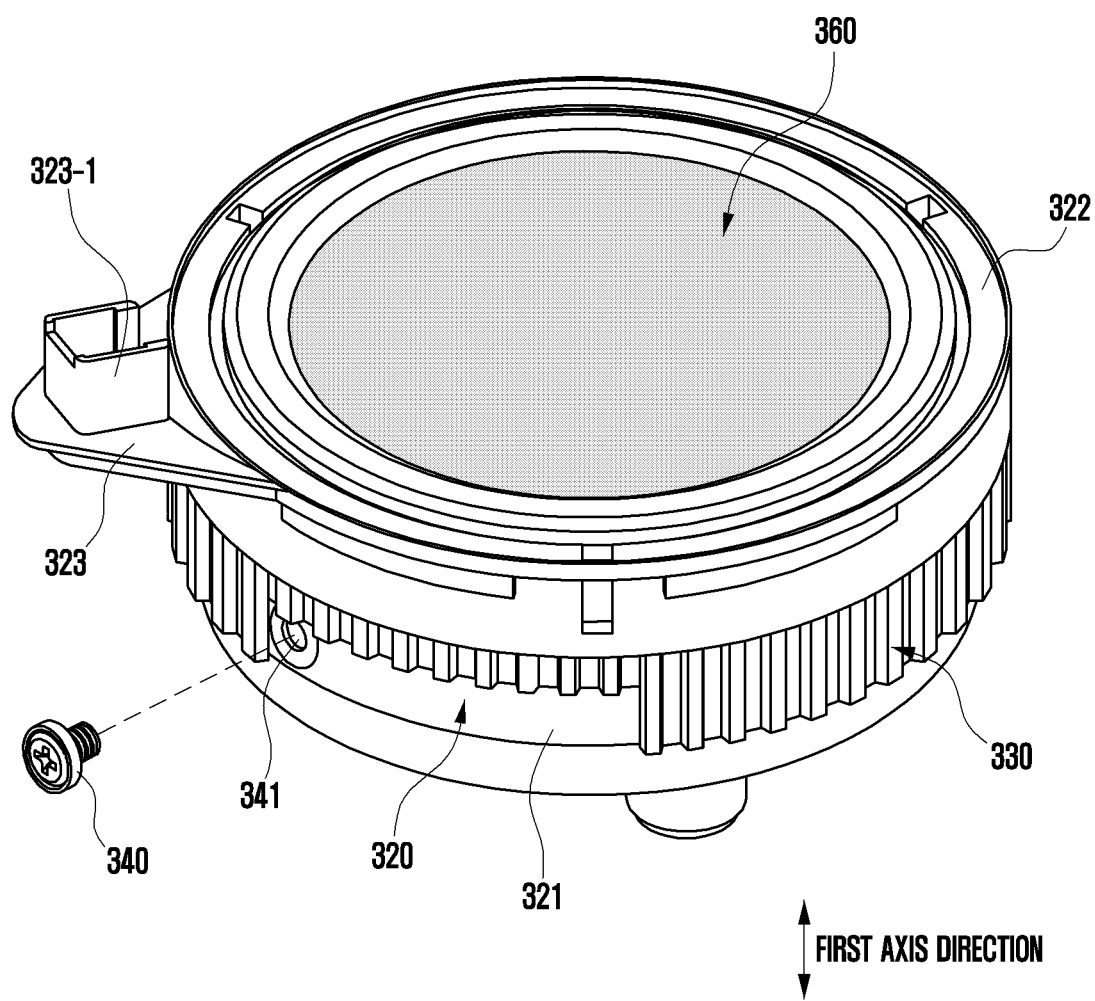

According to an embodiment of the disclosure, a display module 300 may be assembled as follows. Referring to FIGS. 4 and 6A to 6E, the display module 300 may include a front plate 310, a fixed barrel 320, a rotary barrel 330, a first lens module 350, a second lens module 360, a display 370, an eye tracking camera module 410, and/or a light-emitting member 420. Referring to FIGS. 6A and 6B, the rotary barrel 330 may be combined with the fixed barrel 320 so that the rotary barrel 330 is located on an outer surface of a body part 321 of the fixed barrel 320. In an embodiment of the disclosure, the display module 300 may include a stopper 340 configured to limit the degree of rotation of the rotary barrel 330 against the body part 321. The stopper 340 may be inserted into an insertion hole 341 formed on the body part 321 of the fixed barrel 320 and may be fixed to the body part 321. The stopper 340 may limit the amount of rotation of the rotary barrel 330 so that the rotary barrel 330 is rotated by a predetermined angle against the body part 321.

In an embodiment of the disclosure, the second lens module 360 may include a second lens housing 361 and a second lens part 362. The second lens part 362 may be formed of a transparent glass material, and may be configured to transmit an external light. In an embodiment of the disclosure, the second lens part 362 may be formed by a convex lens or a concave lens. The second lens part 362 may be disposed on the second lens housing 361 to be protected against an external impact.

In an embodiment of the disclosure, with reference to FIGS. 6A and 6B, at least a part of the second lens module 360 may be inserted into the body part 321 of the fixed barrel 320. In an embodiment of the disclosure, the second lens housing 361 may include a protrusion part 363 protruding in one direction. The protrusion part 363 of the second lens housing 361 may be inserted into a guide part 331 formed on an inner surface of the rotary barrel 330. The guide part 331 may be formed in a streamlined shape on the inner surface of the rotary barrel 330. The second lens module 360 may move along the guide part 331 through the protrusion part 363 to correspond to the rotation of the rotary barrel 330 against the fixed barrel 320. Accordingly, the second lens module 360 may move in the first axis direction (e.g., first axis direction of FIG. 3) against the fixed barrel 320 to correspond to the rotation of the rotary barrel 330 against the fixed barrel 320. Accordingly, the second lens module 360 may interwork with the rotary barrel 330 through the protrusion part 363.

Figure 6C:
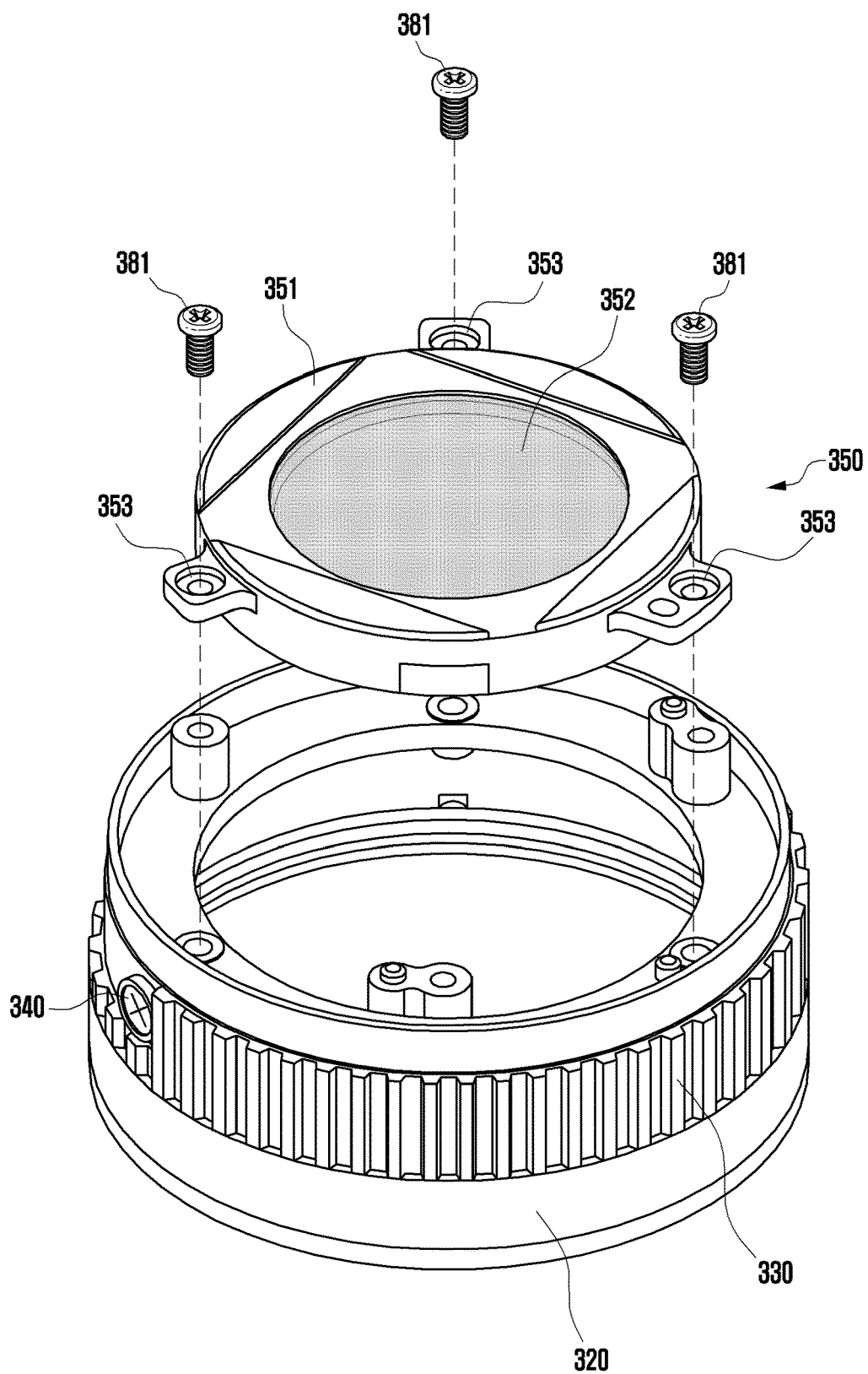

In an embodiment of the disclosure, FIG. 6C may illustrate a state where the display module 300 illustrated in FIG. 6B is flipped 180 degrees. With reference to FIG. 6C, the first lens module 350 may include a first lens housing 351 and a first lens part 352. The first lens part 352 may be formed of a transparent glass material, and may be configured to transmit the external light. In an embodiment of the disclosure, the first lens part 352 may be formed by a convex lens or a concave lens. The first lens part 352 may be disposed on the first lens housing 351 to be protected against the external impact.

According to an embodiment of the disclosure, as illustrated in FIG. 6C, the first lens module 350 may be fixed to the fixed barrel 320. In an embodiment of the disclosure, the first lens module 350 may be fixed to one surface of the fixed barrel 320, and may face the second lens module 360 inserted into the body part 321 of the fixed barrel 320. In an embodiment of the disclosure, the first lens housing 351 of the first lens module 350 may include at least one first fixing hole 353. The first lens module 350 may be fixed to the one surface of the fixed barrel 320 through at least one first fixing member 381 inserted into the at least one first fixing hole 353.

Figure 6D:
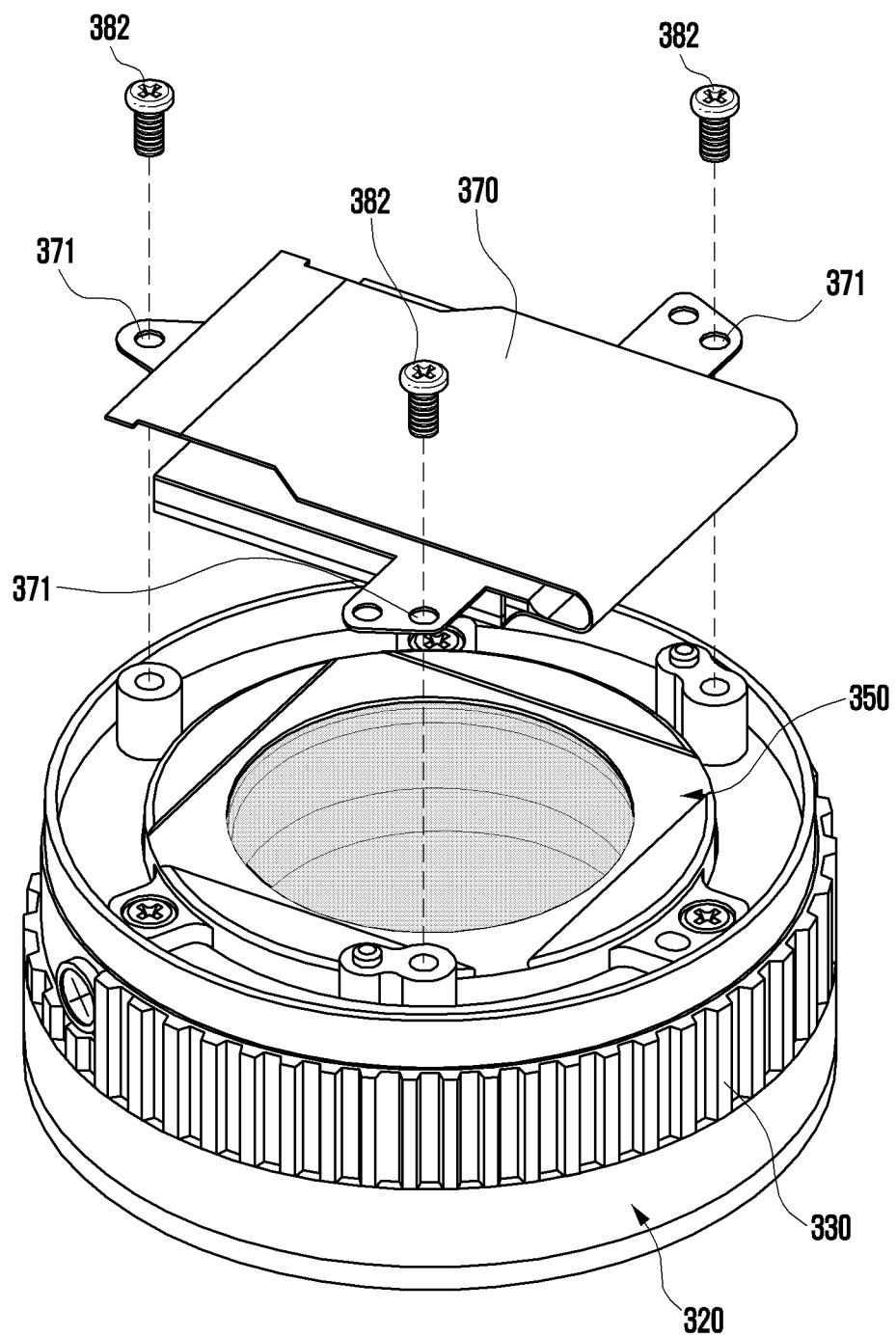
Figure 6E:
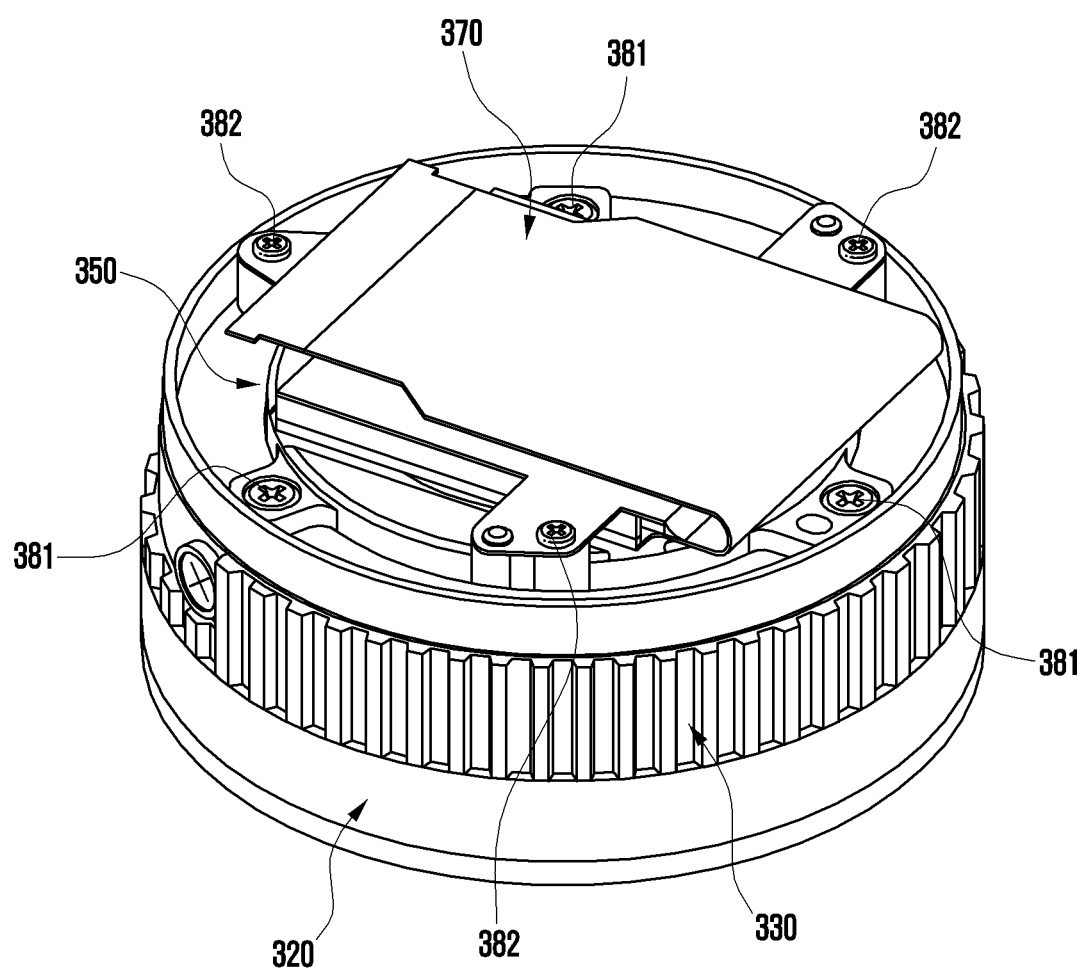

Referring to FIGS. 6D and 6E, the display 370 may be combined with the fixed barrel 320 to cover the first lens module 350. In an embodiment of the disclosure, the display 370 may include a display part (not illustrated) on which an image for a virtual reality is played. The display part of the display 370 may be fixed to the fixed barrel 320 so as to face the first lens part 352 of the first lens module 350. In an embodiment of the disclosure, the display 370 may include at least one second fixing hole 371 into which the second fixing member 382 is inserted. The display 370 may be fixed to the fixed barrel 320 so that the first lens part 352 of the first lens module 350 and the display part of the display 370 on which an image is played face each other through the at least one second fixing member 382 inserted into the at least one second fixing hole 371. Accordingly, the image played on the display 370 may be transferred to the left eye and the right eye of the user by passing through the first lens module 350 to the second lens module 360.

According to an embodiment of the disclosure, the display module 300 may include a diopter adjustment function to compensate for the eyesight of a person with the poor eyesight. The diopter may mean a refractive power of a lens, and may be a reciprocal of a focal length. A person with the poor eyesight may correct the eyesight by adjusting the diopter of the display module 300. According to an embodiment of the disclosure, the user may adjust the diopter of the display module 300 by rotating the rotary barrel 330 of the display module 300 against the fixed barrel 320. In another embodiment that is not illustrated in the drawing, the rotary barrel 330 may be connected to a motor (not illustrated), and may be rotated against the fixed barrel 320 as the user turns on/off a key that is operatively connected to the motor. According to an embodiment of the disclosure, the rotary barrel 330 may be rotated against the fixed barrel 320. The second lens module 360 may interwork with the rotary barrel 330 in motion as the protrusion part 363 is inserted into the guide part 331 formed on the inner surface of the rotary barrel 330. For example, the second lens module 360 may move in the first axis direction against the first lens module 350 fixed to the fixed barrel 320 to correspond to the rotation of the rotary barrel 330 against the fixed barrel 320. In an embodiment of the disclosure, if the rotary barrel 330 is rotated clockwise against the fixed barrel 320, the second lens module 360 may get farther away from the first lens module 350, whereas if the rotary barrel 330 is rotated counterclockwise against the fixed barrel 320, the second lens module 360 may get closer to the first lens module 350. In contrast, if the rotary barrel 330 is rotated clockwise against the fixed barrel 320, the second lens module 360 may get closer to the first lens module 350, whereas if the rotary barrel 330 is rotated counterclockwise against the fixed barrel 320, the second lens module 360 may get farther away from the first lens module 350. As the second lens module 360 moves in the first axis direction against the first lens module 350 relatively fixed to the fixed barrel 320, the interval between the first lens module 350 and the second lens module 360 may be changed. In this case, the focal length for the image on the display, which is transferred to the user by passing through the first lens module 350 to the second lens module 360, may be changed. Accordingly, through the movement of the second lens module 360 against the first lens module 350, the diopter of the display module 300 may be adjusted, and thus the user's eyesight difference may be compensated for.

As described above, the display module 300 may include a plurality of lens modules 350 and 360, and as one (e.g., second lens module 360) of the plurality of lens modules 350 and 360 moves relatively to the other (e.g., first lens module 350) thereof, the diopter may be adjusted. In an embodiment of the disclosure, the eye tracking camera module 410 and the light-emitting member 420 may be disposed on the second lens module 360 based on the mounting space of the display module 300. In such a structure, if the user adjusts the diopter of the display module 300, the eye tracking camera module 410 and the light-emitting member 420 may move together with the second lens module 360 in the first axis direction. In this case, the distance between the eye tracking camera module 410 and the light-emitting member 420 and the user's eye may be changed, and thus a malfunction may occur in tracking the user's eye.

According to an embodiment of the disclosure, at least parts of the eye tracking camera module 410 and the light-emitting member 420 may be disposed on the segment part 322 and/or the seating part 323 of the fixed barrel 320. For example, the camera part 411 of the eye tracking camera module 410 may be fixed to the seating part 323 of the fixed barrel 320, and the light-emitting part 421 of the light-emitting member 420 may be fixed to the segment part 322 of the fixed barrel 320. The fixed barrel 320 may be utensils of which the location relative to the housing 210 is fixed. Accordingly, the camera part 411 of the eye tracking camera module 410 and the light-emitting part 421 of the light-emitting member 420 may have a fixed relative location against the housing 210. Accordingly, even if the camera part 411 and the light-emitting part 421 relatively move in the first axis direction against the fixed barrel 320, the relative locations thereof against the housing 210 may not be changed. Accordingly, the light-emitting part 421 may be fixed to the fixed barrel 320 and may emit the light to the left eye and the right eye of the user regardless of the diopter adjustment through the movement of the second lens module 360. The camera part 411 may be fixed tot the fixed barrel 320, and may track the gazes of the left eye and/or the right eye of the user through the light-emitting part 421.

Figure 7A:
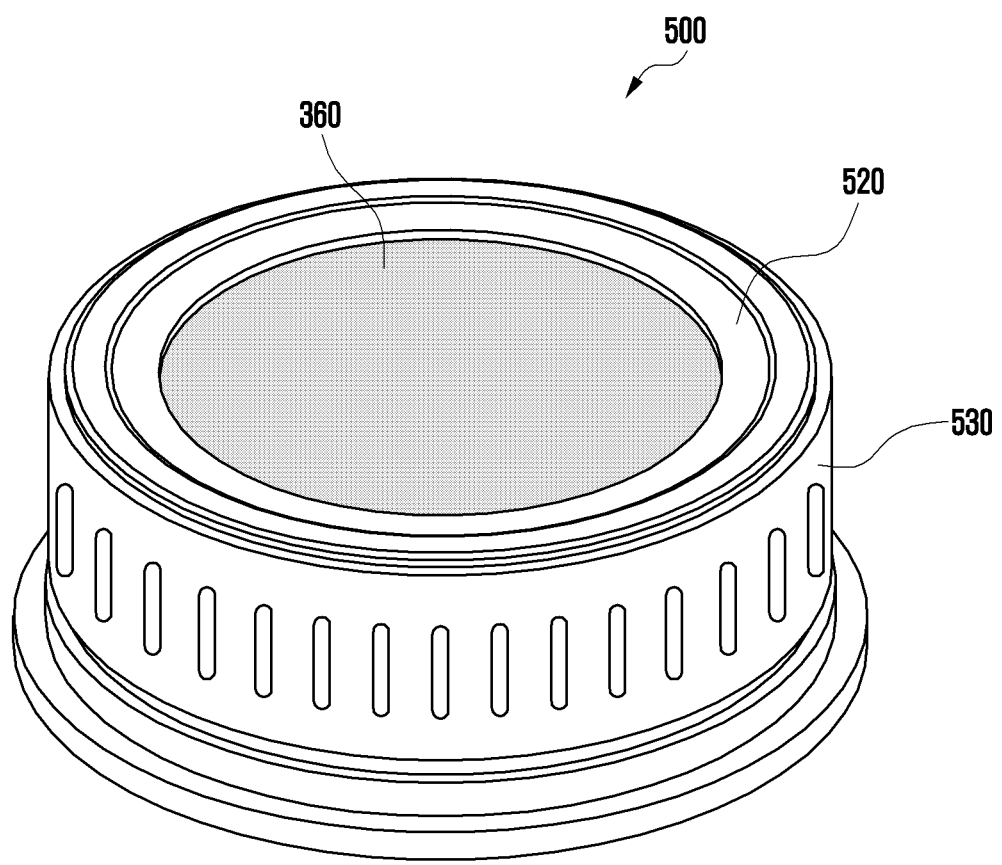
FIG. 7A is a view illustrating a display module that is different from the display module illustrated in FIG. 3 according to an embodiment of the disclosure.
Figure 7B:
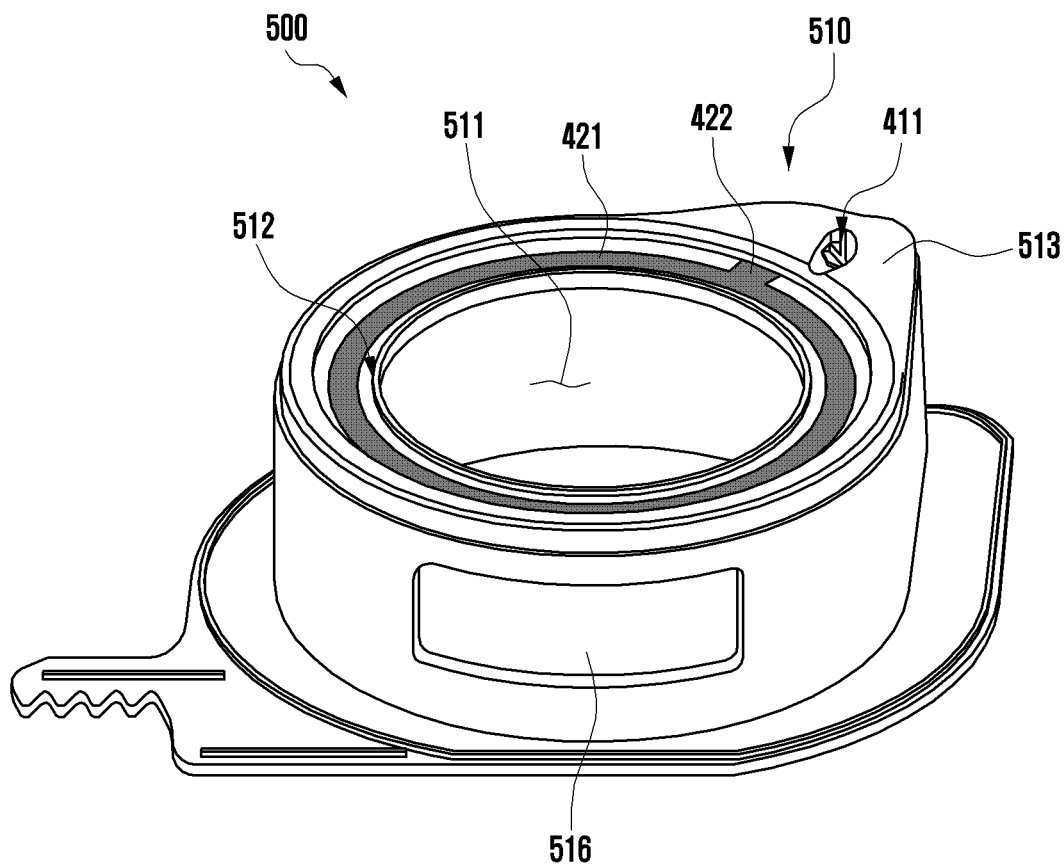
FIG. 7B is a view illustrating a cover member covering an exterior of the display module illustrated in FIG. 7A according to an embodiment of the disclosure.
Figure 7C:
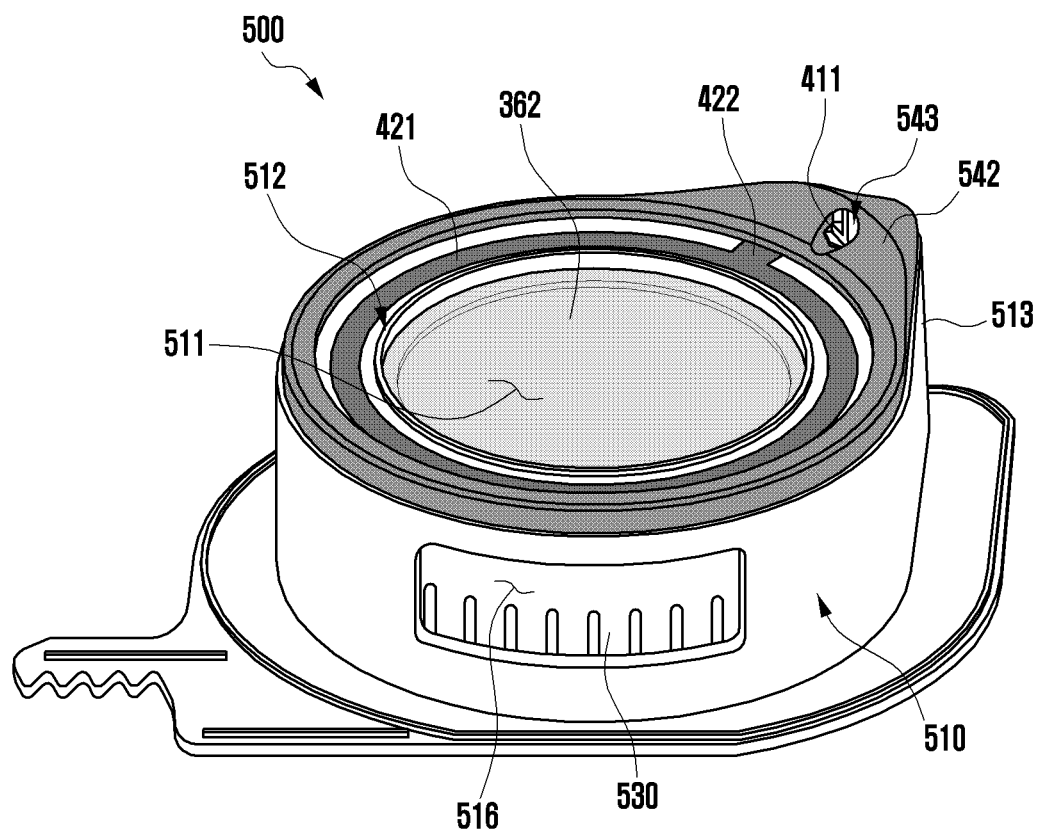
FIG. 7C is a view illustrating a state where the cover member of FIG. 7B is combined with the display module of FIG. 7A according to an embodiment of the disclosure.

FIG. 7A is a view illustrating a display module that is different from the display module illustrated in FIG. 3 according to an embodiment of the disclosure. FIG. 7B is a view illustrating a cover member covering an exterior of the display module illustrated in FIG. 7A according to an embodiment of the disclosure. FIG. 7C is a view illustrating a state where the cover member of FIG. 7B is combined with the display module of FIG. 7A according to an embodiment of the disclosure.

Hereinafter, a display module 500, which is different from the display module 300 described with reference to FIGS. 5A, 5B, and 6A to 6E, according to another embodiment will be described. Explanation of the same or similar constituent elements as or to those as described above will be omitted, and the same reference numerals are to be used for the same constituent elements.

Hereinafter, the display module 500 illustrated in FIGS. 7A to 7C will be described. A plurality of display modules 500, as illustrated in FIG. 2B, may be disposed on the second surface 212 of the housing 210, and may correspond to the left eye and the right eye of the user, respectively. The plurality of display modules 500 may include substantially the same constitutions. For example, the display module 500 may include a front plate 310 (e.g., front plate 310 of FIG. 4), a fixed barrel 520, a first lens module 350 (e.g., first lens module 350 of FIG. 4), a second lens module 360 (e.g., first lens module 350 of FIG. 4), and/or a display 370 (e.g., display 370 of FIG. 4 or display 370 of FIG. 6C). Explanation of the same or similar constituent elements as or to those as described above will be omitted, and the same reference numerals are to be used for the same constituent elements.

Referring to FIG. 7A, the display module 500 may include the fixed barrel 520 and the rotary barrel 530. In an embodiment of the disclosure, as compared with the fixed barrel 520 of the display module 300 described with reference to FIGS. 5A, 5B, and 6A to 6E, the fixed barrel 520 may not include the segment part 322. In an embodiment that is not illustrated in the drawing, the fixed barrel 520 may include the segment part 322. In an embodiment of the disclosure, the eye tracking camera module 410 (e.g., eye tracking camera module 410 of FIG. 4) and the light-emitting member 420 (e.g., light-emitting member 420 of FIG. 4) may not be disposed on the fixed barrel 520. In an embodiment of the disclosure, at least parts of the eye tracking camera module 410 and the light-emitting member 420 may be disposed on a cover member 510 that covers the fixed barrel 520 and the rotary barrel 530.

Referring to FIG. 7B, the display module 500 may include the cover member 510. The cover member 510 may cover parts of the exteriors of the fixed barrel 520 and the rotary barrel 530. In an embodiment of the disclosure, the cover member 510 may include an opening 511 facing the second lens module 360 disposed on the fixed barrel 520, and a segment part 512 surrounding the opening 511. The second lens part 362 of the second lens module 360 may transfer the image played on the display 370 to the left eye and the right eye of the user through the opening 511.

According to an embodiment of the disclosure, as illustrated in FIGS. 7B and 7C, the cover member 510 may include the segment part 512. The cover member 510 may provide an area in which electronic components can be disposed through the segment part 512. For example, at least parts of the eye tracking camera module 410 and/or the light-emitting member 420 may be seated on the segment part 512 of the cover member 510. For example, the camera part 411 (e.g., camera part 411 of FIG. 4) of the eye tracking camera module 410 may be disposed on the seating part 513 protruding from the segment part 512 in one direction. The light-emitting part 421 (e.g., light-emitting part 421 of FIG. 4) of the light-emitting member 420 may be disposed on the segment part 512, and may emit the light toward the user's eyeball. Meanwhile, the segment part 512 of the cover member 510 may be located adjacent to the user's eyeball in a state where the user wears the wearable electronic device 200 so that the display module 500 of the wearable electronic device 200 is located on the left eye and the right eye. For example, there may be no obstacle between the camera part 411 of the eye tracking camera module 410 located on the segment part 512 of the cover member 510 and the user's eyeball and between the light-emitting part 421 of the light-emitting member 420 and the user's eyeball. Accordingly, the eye tracking camera module 410 may track the gazes of the left eye and the right eye of the user by using the light emitted from the light-emitting part 421 toward the user's eyeball.

In an embodiment of the disclosure, with reference to FIG. 7B, the cover member 510 may include a seating part 513 on which the camera part 411 of the eye tracking camera module 410 is seated. The seating part 513 may be a part protruding from the segment part 512 of the cover member 510 in one direction. In an embodiment that is not illustrated in the drawing, the cover member 510 may include a partition part (not illustrated) protruding from the segment part 513 in one direction. The partition part may be formed to surround at least a part of the camera part 411 disposed on the seating part 513 to protect the camera part 411 against the external impact.

In an embodiment of the disclosure, the cover member 510 may include a first hole (not illustrated) through which the first connection part 412 (e.g., first connection part 412 of FIG. 4) of the eye tracking camera module 410 passes. For example, the first hole may be formed on at least one of the segment part 512 and the seating part 513. The first connection part 412 may be electrically connected to the printed circuit board by passing through the first hole formed on the seating part 513. For example, the eye tracking camera module 410 may be electrically connected to the printed circuit board as the first connector 413 disposed on one end of the first connection part 412 is inserted into another connector disposed on the printed circuit board or is soldered on the printed circuit board.

In an embodiment of the disclosure, the cover member 510 may include a second hole through which the second connection part 422 (e.g., second connection part 422 of FIG. 4) of the light-emitting member 420 passes. The second hole may be formed on at least one of the segment part 512 and the seating part 513. The second connection part 422 may be electrically connected to the printed circuit board by passing through the second hole. For example, the light-emitting member 420 may be electrically connected to the printed circuit board as the second connector 423 disposed on one end of the second connection part 422 is inserted into another connector disposed on the printed circuit board or is soldered on the printed circuit board.

In an embodiment of the disclosure, with reference to FIG. 7B, the front plate 310 (e.g., front plate 410 of FIG. 4) may be disposed to cover the cover member 510. The front plate 310 may include a window 311 (e.g., window 411 of FIG. 4) facing the second lens part 362 of the second lens module 360. The window 311 of the front plate 310 may be located in the opening 511 of the cover member 510 and may face the second lens part 362. In an embodiment of the disclosure, the window 311 may be formed of a transparent plate (e.g., glass plate including various coating layers or polymer plate). Accordingly, the user can visually recognize an image generated from the display 370 through the first lens module 350 to the second lens module 360.

In an embodiment of the disclosure, with reference to FIG. 7B, a camera housing 312 (e.g., camera housing 412 of FIG. 4) may be disposed on the seating part 513 of the cover member 510 so as to cover the camera part 411 of the eye tracking camera module 410 disposed on the cover member 510. The camera housing 312 may include a camera hole 543 (e.g., the camera hole 313 of FIG. 3), and the camera hole 543 may be disposed on the seating part 513 of the cover member 510 so that the camera hole 543 corresponds to the camera part 411. In an embodiment of the disclosure, the camera housing 312 may be integrally formed with the front plate 310, and in a certain embodiment of the disclosure, the camera housing 312 may be formed as a separate constitution from the front plate 310.

According to an embodiment, of the disclosure as illustrated in FIGS. 7B and 7C, the cover member 510 may include a slit 516 through which at least a part of the rotary barrel 530 is exposed. Through rotation of the rotary barrel 530 exposed through the slit 516 of the cover member 510 of the user against the fixed barrel 520, it may be possible to adjust the diopter by moving the second lens module 360 in the first axis direction (e.g., first direction of FIG. 3) against the first lens module 350.

In an embodiment that is not illustrated in the drawings, the display module 500 may include a motor connected to the rotary barrel 530. A processor 120 (e.g., processor 120 of FIG. 1) for controlling the motor may receive a user's input to control the motor. For example, the processor 120 may receive a user's input to turn on/off a key (not illustrated) being operatively connected to the processor 120 to control the motor. For example, if the user applies an input to operate the rotary barrel 530, the processor 120 may move the second lens module 360 in the first axis direction by rotating the rotary barrel 530 against the fixed barrel 520. In this case, the cover member 510 may not include the slit 516 for rotating the rotary barrel 530.

According to an embodiment of the disclosure, the user can adjust the diopter of the display module 500 by rotating the rotary barrel 530 of the display module 500 against the fixed barrel 520. According to an embodiment of the disclosure, the rotary barrel 530 may be rotated against the fixed barrel 520. The second lens module 360 may interwork with the rotary barrel 530, and may move in the first axis direction against the first lens module 350 as the rotary barrel 530 is rotated against the fixed barrel 520. Accordingly, the interval between the first lens module 350 and the second lens module 360 may be changed. In this case, the focal length for an image of the display 370, which passes through the first lens module 350 to the second lens module 360 and is transferred to the user, may be changed. Accordingly, through the movement of the second lens module 360 against the first lens module 350, the diopter of the display module 500 may be adjusted, and thus the user's eyesight difference can be compensated for.

As described above, the display module 300 or 500 may include the plurality of lens modules 350 and 360, and the diopter may be adjusted by relatively moving one (e.g., second lens module 360) of the plurality of lens modules 350 and 360 against the other (e.g., first lens module 350) of the plurality of lens modules. The eye tracking camera module 410 and the light-emitting member 420 may be disposed on the second lens module 360 based on the mounting space of the display module 500. In such a structure, if the user adjusts the diopter of the display module 500, the light-emitting member 420 of the eye tracking camera module 410 and the light-emitting member may move together with the second lens module 360 in the first axis direction. In this case, as the distance between the light-emitting member 420 of the eye tracking camera module 410 and the user's eye is changed, a malfunction may occur in tracking the user's eye.

According to an embodiment of the disclosure, the cover member 510 may provide an area in which the eye tracking camera module 410 and the light-emitting member 420 can be disposed. At least parts of the eye tracking camera module 410 and/or the light-emitting member 420 may be disposed on the segment part 512 and/or the seating part 513 of the cover member 510. For example, the camera part 411 of the eye tracking camera module 410 may be fixed to the seating part 513 of the cover member 510, and the light-emitting part 421 of the light-emitting member 420 may be fixed to the segment part 512 of the cover member 510. The cover member 510 may be utensils of which the location relative to the housing 210 is fixed. Accordingly, the camera part 411 of the eye tracking camera module 410 and the light-emitting part 421 of the light-emitting member 420 may have a fixed relative location against the housing 210. Accordingly, even if the camera part 411 and the light-emitting part 421 relatively move in the first axis direction against the fixed barrel 520 and the cover member 510, the relative locations thereof against the housing 210 may not be changed. Accordingly, the light-emitting part 421 may be fixed to the fixed barrel 520 and may emit the light to the left eye and the right eye of the user regardless of the diopter adjustment through the movement of the second lens module 360.

A wearable electronic device 200 according to an embodiment of the disclosure may include: a housing 210 configured to form an exterior of the wearable electronic device; and at least one display module 300 disposed on the housing, wherein the display module includes: a fixed barrel 320 including a body part 321 and a segment part 322 protruding along an outer periphery of the body part; a rotary barrel 330 disposed on an outer surface of the body part and rotatably combined with the body part; a first lens module 350 fixed to the body part of the fixed barrel; a display 370 combined with the fixed barrel to cover the first lens module; a second lens module 360 inserted into the body part of the fixed barrel to face the first lens module, engaged with the rotary barrel, and configured to move in a first axis direction against the first lens module as the rotary barrel is rotated against the fixed barrel; a light-emitting member 420 disposed on the segment part of the fixed barrel; and an eye tracking camera module 410 disposed adjacent to the light-emitting member and configured to track a user's eye.

Further, the fixed barrel may include a seating part 323 on which the eye tracking camera module is disposed.

Further, the seating part may protrude from the segment part of the fixed barrel in one direction.

Further, the wearable electronic device may further include a printed circuit board disposed in the housing, wherein the eye tracking camera module may include a camera part 411 disposed on the seating part of the fixed barrel and a first connection part 412 extending from the camera part and connected to the printed circuit board, and the fixed barrel may include a first hole 324 through which the first connection part passes.

Further, the housing may include a protrusion part surrounding at least a part of the display module, and the eye tracking camera module may be disposed on the protrusion part.

Further, the wearable electronic device may further include a stopper 340 disposed on the body part of the fixed barrel and configured to limit the rotation of the rotary barrel so that the rotary barrel is rotated by a predetermined angle against the body part.

Further, the wearable electronic device may further include a display 370 combined with the fixed barrel so as to cover the first lens module.

Further, the wearable electronic device may further include a printed circuit board disposed in the housing, wherein the light-emitting member may include a light-emitting part 421 disposed on the segment part of the fixed barrel and a second connection part 422 extending from the light-emitting part 421 and connected to the printed circuit board, and the fixed barrel may include a second hole 325 through which the second connection part passes.

Further, the rotary barrel may include a guide part 331 formed along an inner surface thereof, and the second lens module may include a protrusion part 363 inserted into the guide part.

Further, the wearable electronic device may further include a front plate 310 including a window 311 disposed on the fixed barrel to face the second lens module, and configured to cover the segment part of the fixed barrel.

A wearable electronic device 200 according to an embodiment of the disclosure may include: a housing 210 configured to form an exterior of the wearable electronic device; and at least one display module 500 disposed on the housing, wherein the display module includes: a fixed barrel 520; a rotary barrel 530 disposed on an outer surface of the fixed barrel and rotatably combined with the fixed barrel; a first lens module 350 fixed to the fixed barrel; a second lens module 360 inserted inside the fixed barrel to face the first lens module, engaged with the rotary barrel, and configured to move in a first axis direction against the first lens module as the rotary barrel is rotated against the fixed barrel; a cover member 510 including an opening 511 facing the second lens module and a segment part 512 surrounding the opening, and covering the fixed barrel and the rotary barrel; a light-emitting member 420 disposed on the segment part of the cover member; and an eye tracking camera module 410 disposed adjacent to the light-emitting member and configured to track a user's eye.

Further, the cover member may include a seating part 513 on which the eye tracking camera module is disposed.

Further, the seating part may protrude from the segment part of the cover member in one direction.

Further, the electronic device may further include a printed circuit board disposed in the housing, wherein the eye tracking camera module may include a camera part 411 disposed on the seating part of the cover member and a first connection part 412 extending from the camera part and connected to the printed circuit board, and the cover member may include a first hole 324 through which the first connection part passes.

Further, the housing may include a protrusion part surrounding at least a part of the display module, and the eye tracking camera module may be disposed on the protrusion part.

Further, the wearable electronic device may further include a printed circuit board disposed in the housing, wherein the light-emitting member may include a light-emitting part 421 disposed on the segment part of the cover member and a second connection part 422 extending from the light-emitting part 421 and connected to the printed circuit board, and the fixed barrel may include a second hole 325 through which the second connection part passes.

Further, the wearable electronic device may further include a display 370 combined with the fixed barrel so as to cover the first lens module.

Further, the cover member may include a slit 516 through which at least a part of the rotary barrel is exposed.

Further, the wearable electronic device may further include a motor connected to the rotary barrel, and a processor 120 electrically connected to the motor, wherein the processor may be configured to control the motor so that the rotary barrel is rotated against the fixed barrel.

Further, the wearable electronic device may further include a front plate 310 including a window 311 disposed on the cover member to face the second lens module, and configured to cover the segment part of the cover member.

According to an embodiment disclosed in this document, the eye tracking camera module 410 and the light-emitting member 420 may be disposed on the display module 300 or 500 in which the diopter adjustment is possible. Further, the locations of the eye tracking camera module 410 and the light-emitting member 420 against the display module 300 or 500 may be fixed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A wearable electronic device comprising:
a housing configured to form an exterior of the wearable electronic device;
a printed circuit board disposed on the housing; and
at least one display module disposed on the housing, wherein the display module includes:
a fixed barrel including a body part and a segment part protruding along an outer periphery of the body part,
a rotary barrel disposed on an outer surface of the body part and rotatably combined with the body part,
a first lens module fixed to the body part of the fixed barrel,
a display combined with the fixed barrel to cover the first lens module,
a second lens module inserted into the body part of the fixed barrel to face the first lens module, engaged with the rotary barrel, and configured to move in a first axis direction against the first lens module as the rotary barrel is rotated against the fixed barrel,
a light-emitting member disposed on the segment part of the fixed barrel, and
an eye tracking camera module disposed adjacent to the light-emitting member and configured to track a user's eye,
wherein the light-emitting member includes a light-emitting part disposed on the segment part of the fixed barrel and a first connection part extending from the light-emitting part and connected to the printed circuit board, and wherein the fixed barrel includes a first hole through which the first connection part passes.

2. The wearable electronic device of claim 1, wherein the fixed barrel comprises a seating part on which the eye tracking camera module is disposed.

3. The wearable electronic device of claim 2, wherein the seating part protrudes from the segment part of the fixed barrel in one direction.

4. The wearable electronic device of claim 2, further comprising:
   a printed circuit board disposed in the housing,
   wherein the eye tracking camera module includes a camera part disposed on the seating part of the fixed barrel and a second connection part extending from the camera part and connected to the printed circuit board, and
   wherein the fixed barrel includes a second hole through which the second connection part passes.

5. The wearable electronic device of claim 1,
   wherein the housing comprises a protrusion part surrounding at least a part of the display module, and
   wherein the eye tracking camera module is disposed on the protrusion part.

6. The wearable electronic device of claim 1, further comprising:
   a stopper disposed on the body part of the fixed barrel and configured to limit a rotation of the rotary barrel so that the rotary barrel is rotated by a predetermined angle against the body part.

7. The wearable electronic device of claim 1, further comprising:
   a display combined with the fixed barrel so as to cover the first lens module.

8. The wearable electronic device of claim 1,
   wherein the rotary barrel includes a guide part formed along an inner surface thereof, and
   wherein the second lens module includes a protrusion part inserted into the guide part.

9. The wearable electronic device of claim 1, further comprising:
   a front plate including a window disposed on the fixed barrel to face the second lens module, and configured to cover the segment part of the fixed barrel.

10. A wearable electronic device comprising:
    a housing configured to form an exterior of the wearable electronic device;
    a printed circuit board disposed on the housing; and
    at least one display module disposed on the housing,
    wherein the display module includes:
       a fixed barrel,
       a rotary barrel disposed on an outer surface of the fixed barrel and rotatably combined with the fixed barrel,
       a first lens module fixed to the fixed barrel,
       a second lens module inserted inside the fixed barrel to face the first lens module, engaged with the rotary barrel, and configured to move in a first axis direction against the first lens module as the rotary barrel is rotated against the fixed barrel,
       a cover member including an opening facing the second lens module and a segment part surrounding the opening, and covering the fixed barrel and the rotary barrel,
       a light-emitting member disposed on the segment part of the cover member, and
       an eye tracking camera module disposed adjacent to the light-emitting member and configured to track a user's eye,
    wherein the light-emitting member includes a light-emitting part disposed on the segment part of the cover member and a first connection part extending from the light-emitting part and connected to the printed circuit board, and
    wherein the fixed barrel includes a first hole through which a second connection part passes.

11. The wearable electronic device of claim 10, wherein the cover member comprises a seating part on which the eye tracking camera module is disposed.

12. The wearable electronic device of claim 11, wherein the seating part protrudes from the segment part of the cover member in one direction.

13. The wearable electronic device of claim 11, further comprising:
    a printed circuit board disposed in the housing,
    wherein the eye tracking camera module includes a camera part disposed on the seating part of the cover member and the second connection part extending from the camera part and connected to the printed circuit board, and
    wherein the cover member includes a second hole through which the second connection part passes.

14. The wearable electronic device of claim 10,
    wherein the housing comprises a protrusion part surrounding at least a part of the display module, and
    wherein the eye tracking camera module is disposed on the protrusion part.

15. The wearable electronic device of claim 10, further comprising:
    a display combined with the fixed barrel so as to cover the first lens module.

16. The wearable electronic device of claim 10, wherein the cover member comprises a slit through which at least a part of the rotary barrel is exposed.

17. The wearable electronic device of claim 10, further comprising:
    a motor connected to the rotary barrel; and
    a processor electrically connected to the motor,
    wherein the processor is configured to control the motor so that the rotary barrel is rotated against the fixed barrel.

18. The wearable electronic device of claim 10, further comprising:
    a front plate including a window disposed on the cover member to face the second lens module, and configured to cover the segment part of the cover member.

* * * * *